Oct. 6, 1964                    W. ANGST ETAL                    3,151,927
                            PROJECTED TRACKING DISPLAY
Filed May 18, 1962                                          12 Sheets-Sheet 1

INVENTORS
WALTER ANGST
MICHAEL WENGRYN
BY JOHN GOODLET, JR.
LUDWIK I. SEIFERT
JOSEPH VON RANSON
OSTROLENK, FABER, GERB & SOFFEN
ATTORNEYS

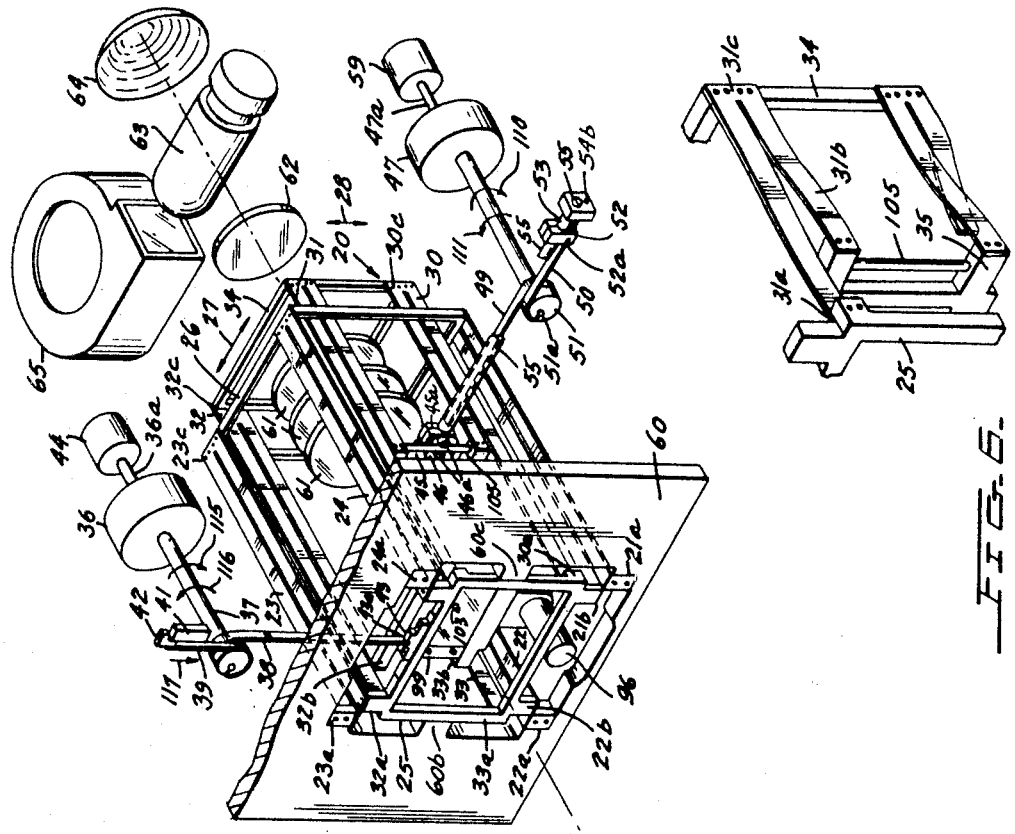
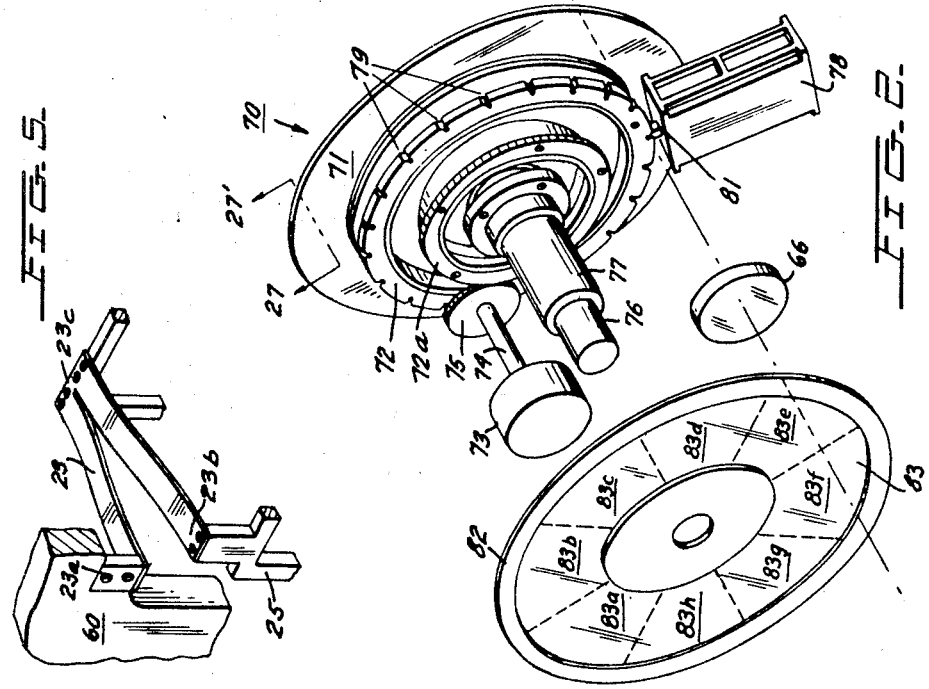

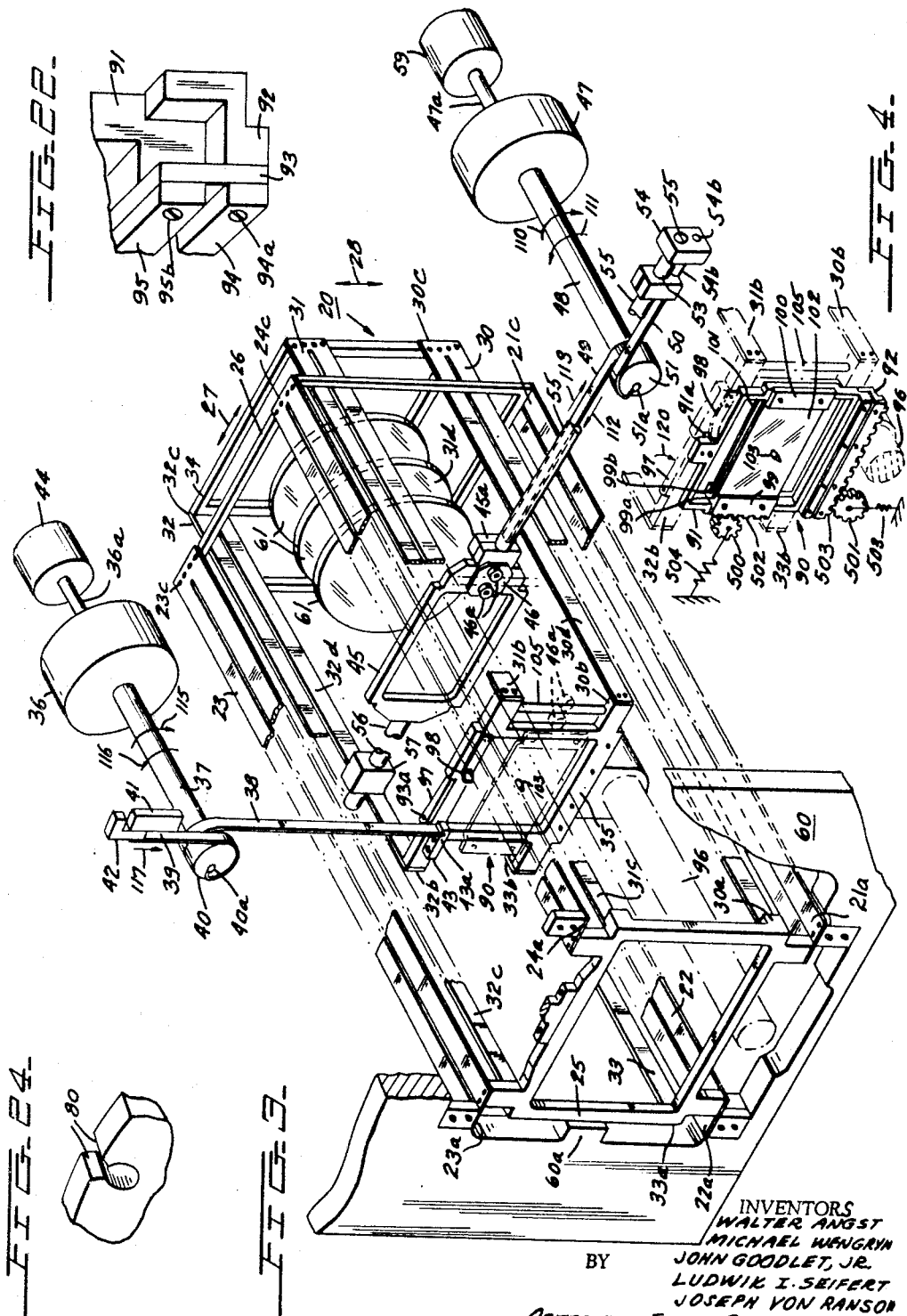

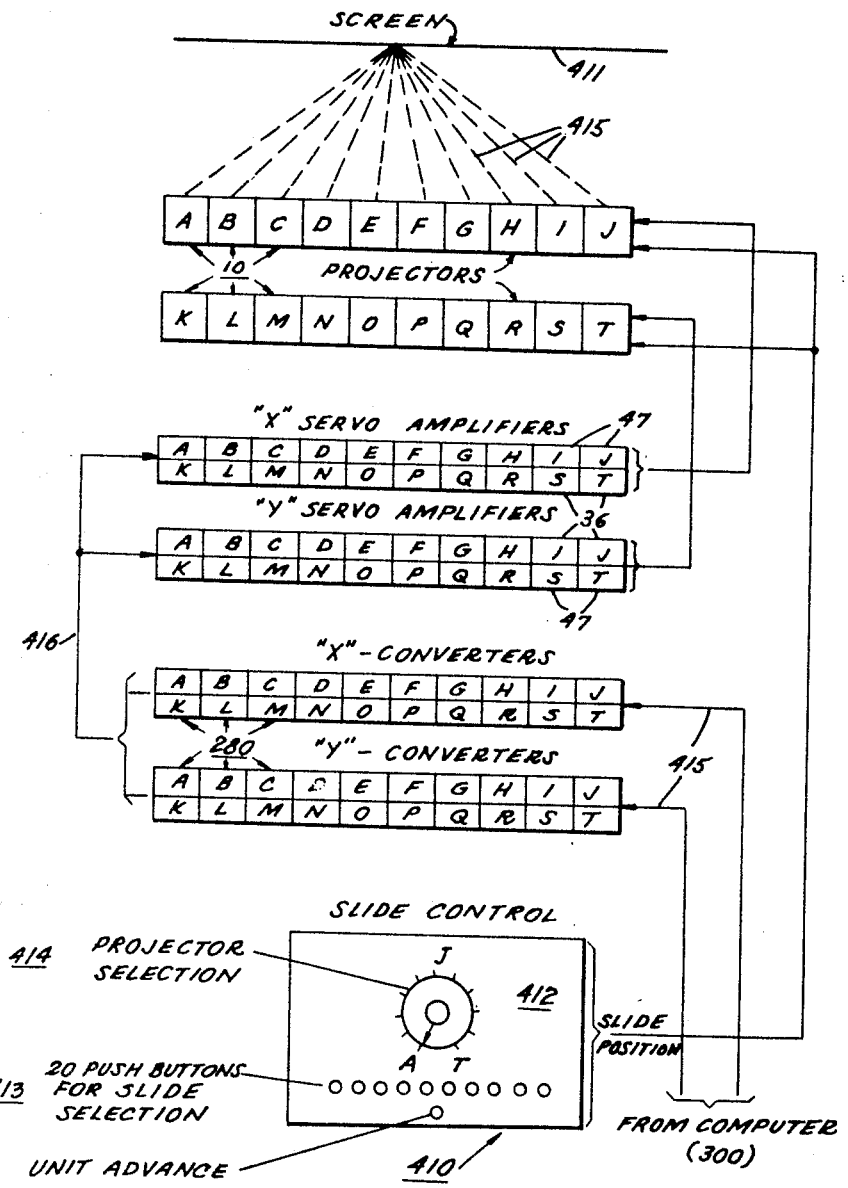

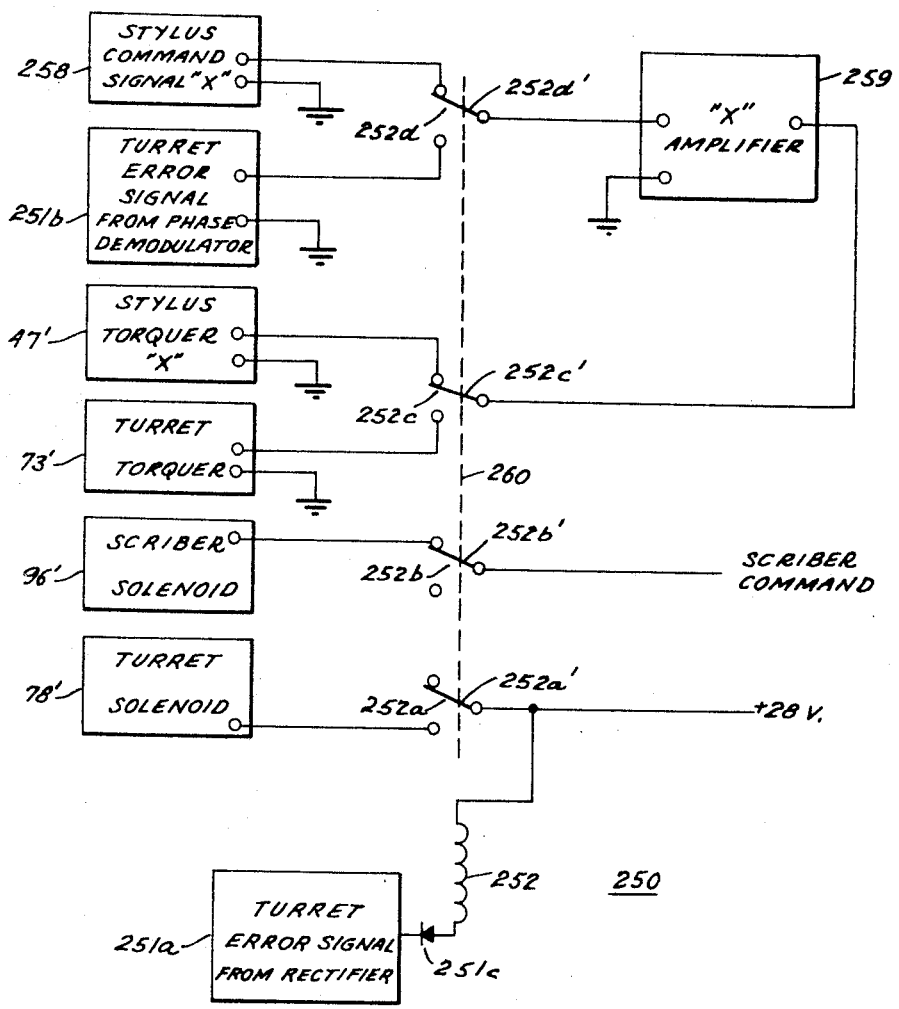

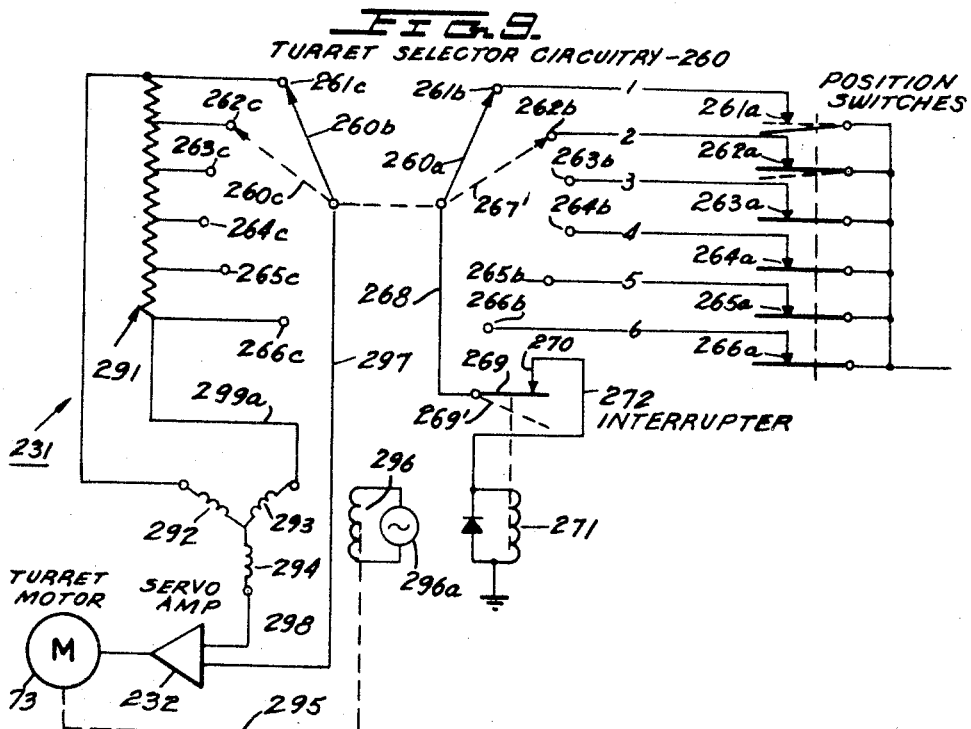
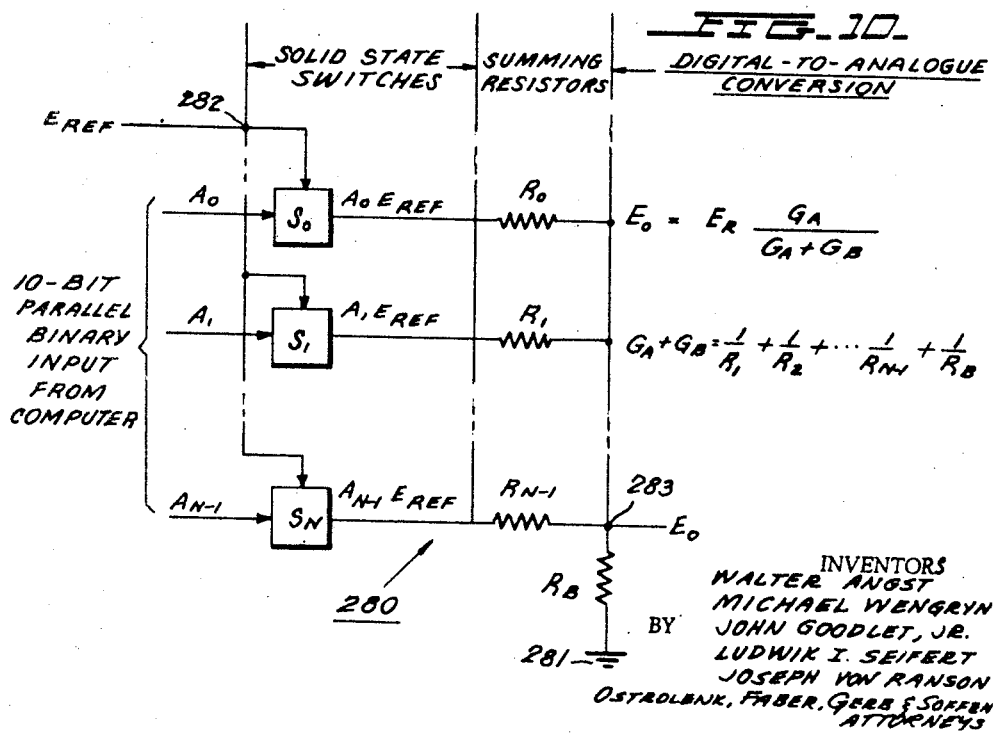

Oct. 6, 1964

W. ANGST ETAL 3,151,927

PROJECTED TRACKING DISPLAY

Filed May 18, 1962

$\dfrac{R_1}{R_{10}} = \dfrac{512}{1}$

INVENTORS
WALTER ANGST
MICHAEL WENGRYN
JOHN GOODLET, JR.
LUDWIK I. SEIFERT,
JOSEPH VON RANSON
BY
OSTROLENK, FABER, GERB & SOFFEN
ATTORNEYS

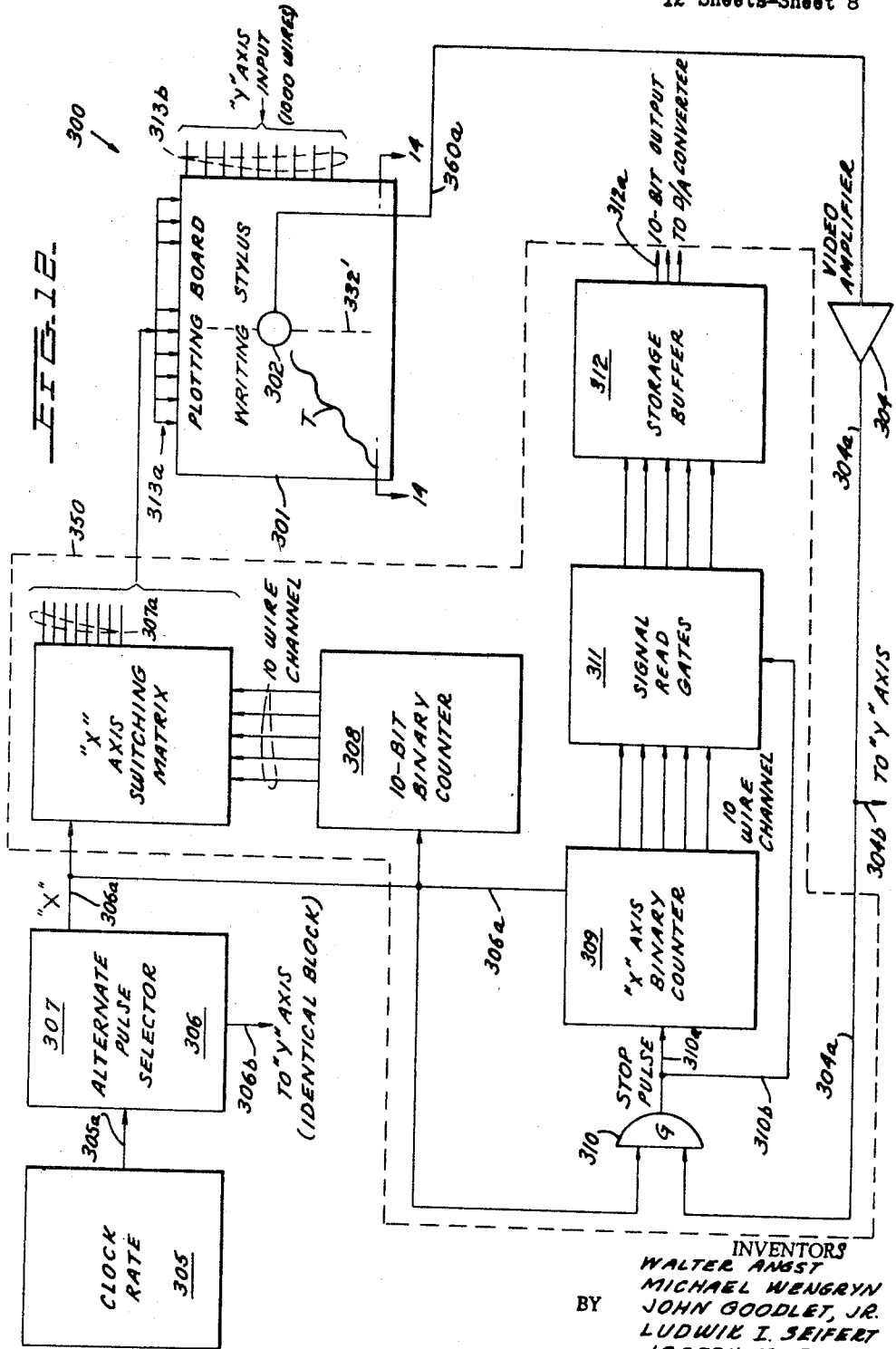

Oct. 6, 1964  W. ANGST ETAL  3,151,927
PROJECTED TRACKING DISPLAY
Filed May 18, 1962  12 Sheets-Sheet 9
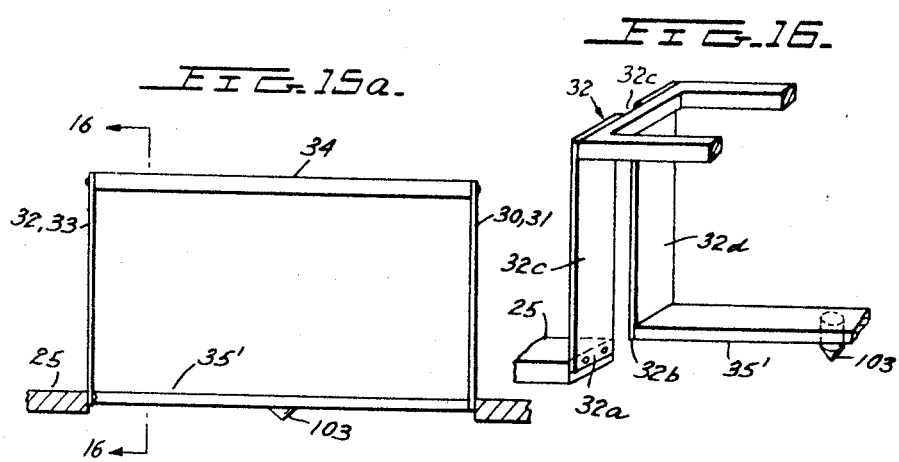
FIG. 15a.
FIG. 16.
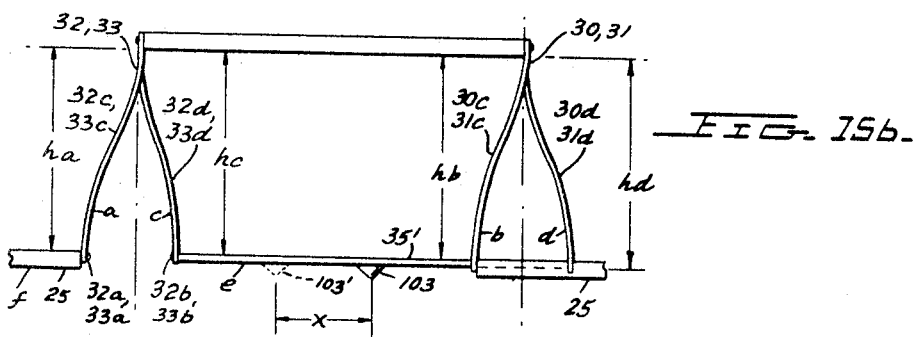
FIG. 15b.
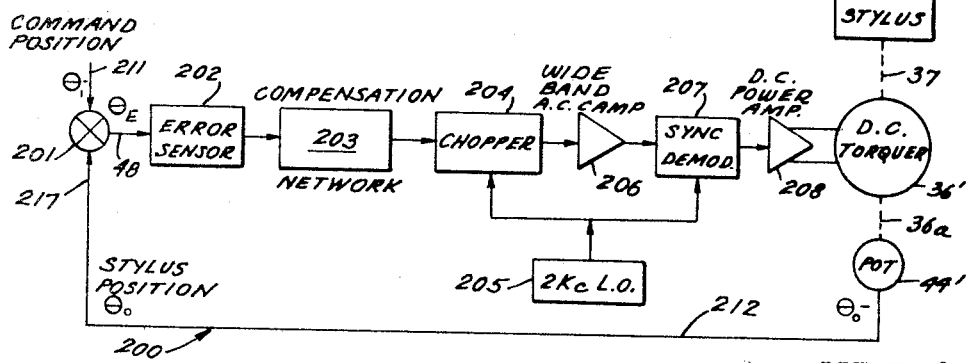
FIG. 17.
INVENTORS
WALTER ANGST
MICHAEL WENGRYN
JOHN GOODLET, JR.
LUDWIK I. SEIFERT
JOSEPH VON RANSON
BY OSTROLENK, FABER, GERB & SOFFEN
ATTORNEYS Oct. 6, 1964 W. ANGST ETAL 3,151,927
PROJECTED TRACKING DISPLAY
Filed May 18, 1962 12 Sheets-Sheet 10
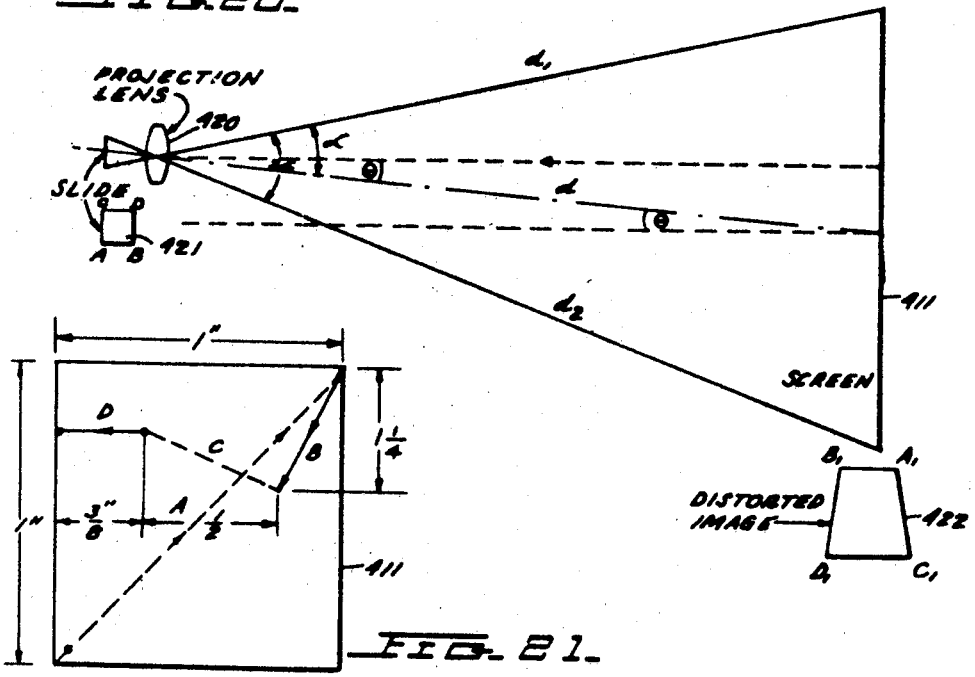
FIG. 20.
FIG. 21.
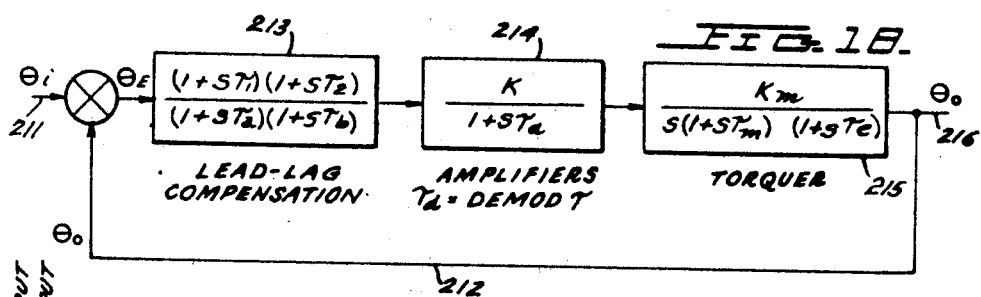
FIG. 18.
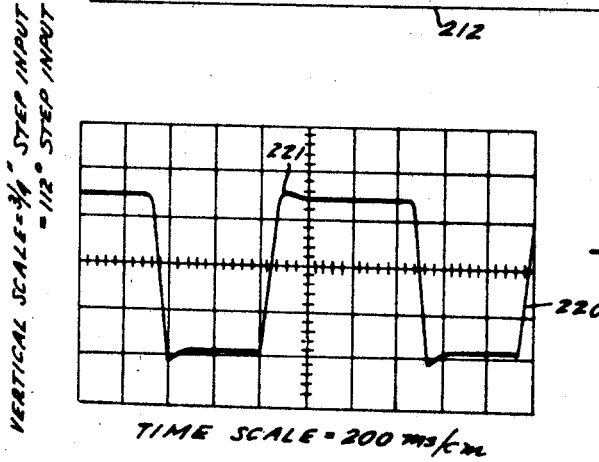
FIG. 19.
INVENTORS
WALTER ANGST
MICHAEL WENGRYN
JOHN GOODLET, JR.
LUDWIK I. SEIFERT
JOSEPH VON RANSON
BY
OSTROLENK, FABER, GERB & SOFFEN
ATTORNEYS

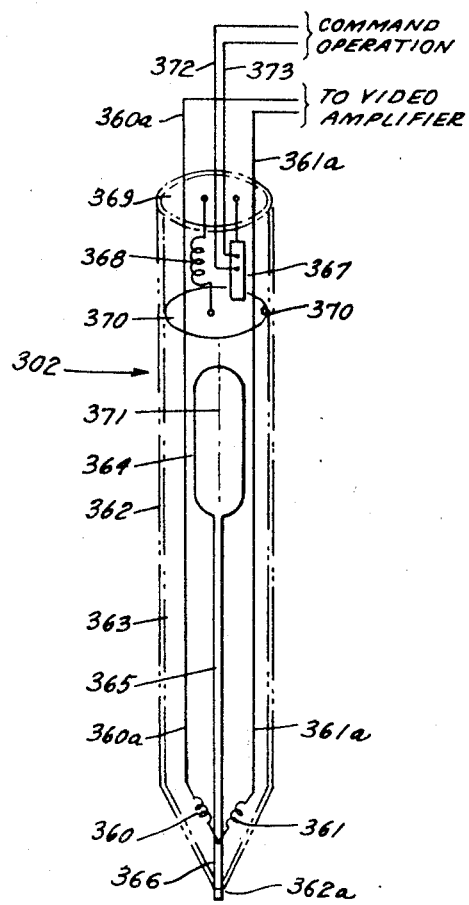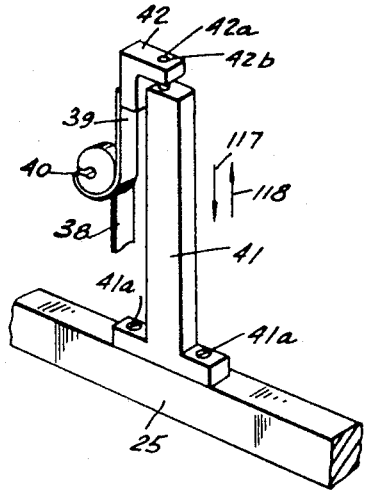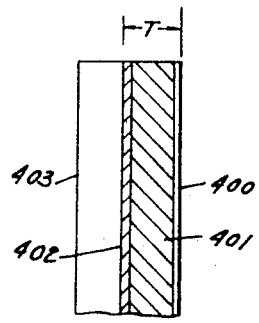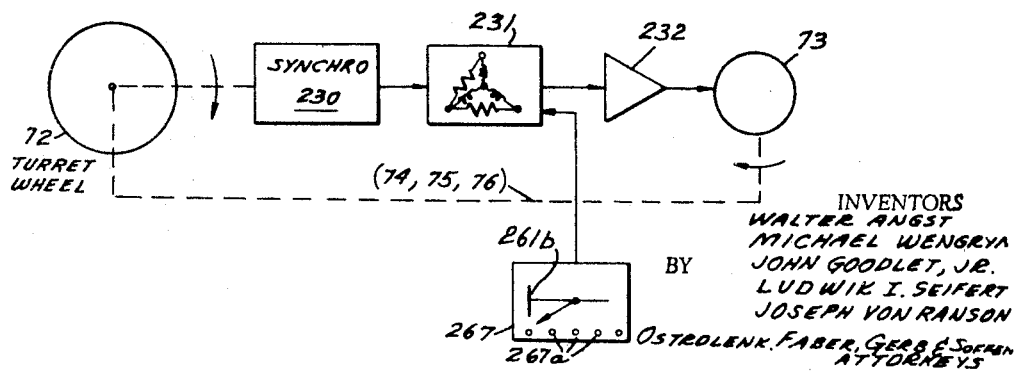

Oct. 6, 1964  W. ANGST ETAL  3,151,927
PROJECTED TRACKING DISPLAY

Filed May 18, 1962  12 Sheets-Sheet 12

FIG. 29.

INVENTORS
WALTER ANGST
MICHAEL WENGRYN
BY JOHN GOODLET, JR.
LUDWIK I. SEIFERT
JOSEPH VON RANSON
OSTROLENK, FABER, GERB & SOFFEN
ATTORNEYS

3,151,927
PROJECTED TRACKING DISPLAY
Walter Angst, Douglaston, Michael Wengryn, Bellerose, John Goodlet, Jr., Elmhurst, and Ludwik I. Seifert, Port Washington, N.Y., and Joseph von Ranson, New Milford, Conn., assignors to Kollsman Instrument Corporation, Elmhurst, N.Y., a corporation of New York
Filed May 18, 1962, Ser. No. 195,887
64 Claims. (Cl. 346—25)

Our invention relates to a projector system and more particularly to a projector system for simultaneously displaying and plotting data wherein the plotting subsystem responds rapidly and accurately to input data while avoiding the need for gearing or worm drive control means and wherein the projection system produces a visual display of high resolution with high speed automatic slide changing ability.

Graphic representations developed for the purposes of analyzing data find large every day use in scientific business and military applications to name just a few. Graphic representations for analysis purposes may be prepared in a variety of different ways. In order, however, to provide observation of the graphic plot concurrently with the plotting operation the most advantageous system has been found to be a combined electro-optical arrangement.

Having now determined that a combined electro-optical arrangement should be employed in the plotting operation, the basic problem is to determine what type of electro-optical arrangement should be employed which will enable the superimposition of graphic images upon one another by a plurality of such electro-optical devices. In the normal projector systems presently in use, images are projected by imposing opaque objects in front of an illuminating source so that the image takes the form of a dark object upon an illuminated screen (i.e. a dark line on a white background). This presents the problem of destruction of the image from one projector by the light source of another projector, thereby, destroying the clarity of the superimposed images.

In order to overcome this disadvantage, it has been decided that the projection device be adapted to project a light image upon a dark screen (i.e. a line of light on a dark background), which arrangement advantageously lends itself to superimposition of images from a plurality of projectors upon a single screen. Thus, the arrangement decided upon which is embodied in the instant invention consists of an opaque coating and an associated scribing stylus wherein the stylus experiences translational motion under control of electrical input signals for the purpose of scribing (or removing) the opaque coating of a transparent surface. The term "scribing stylus" employed herein is hereinafter intended to mean the removing (or scratching) of the opaque coating from a transparent substrate whereas the term "writing stylus" is hereinafter intended to mean the act of writing upon a surface such as writing with ink upon a writing surface (i.e. paper). The portion of the opaque coating which has been grooved by the stylus is simultaneously optically projected upon a screen wherein the observation of the projected image takes place concurrently with the operation of the scribing stylus.

Operation of the stylus is performed in instruments of this nature presently in use by controlling the two dimensional movement of the stylus by means of voltage responsive motors which move the stylus by means of precision gearing mechanisms wherein a first motor and gear arrangement drives the stylus in the horizontal direction and a second motor and gear arrangement drives the stylus in the vertical direction whereby the distance which the stylus is driven is determined by the magnitude of the input signals to the voltage responsive motors.

In order that the graph being developed may be observed continuously throughout the plotting operation the stylus used to generate the graph is secured to a transparent member which does not obstruct the light source employed to project the graphic plot upon a viewing screen.

The accuracy of plotter projector systems of this type is greatly impaired due to the inability of the gearing or worm drives employed in such a system to accurately position the stylus under control of the input signals. This is due to the inherent problems of backlash, hunting and low torque-to-inertia ratio found in such gear connected systems.

Our novel plotter projector is so designed to provide accurate high speed graphic plotting with concurrent projection of the plot being generated by the employment of direct drive means which control the stylus motion in response to the voltage input signals. The coating arrangement provides a sharp image of the graph to be projected. This arrangement completely avoids all of the undesirable features inherent in a gear connected system such as those employed in prior art devices.

The device of our invention is comprised of a transparent stylus mounting which is moved in a vertical plane by means of a direct stylus drive which is operatively connected to the stylus mounting means by means of a shaft driven tape assembly. Transducer means for measuring the stylus horizontal and vertical positions respectively are mounted directly to the drive shaft means for providing a precise voltage indication of the stylus position in response to shaft rotation.

The suspension for the stylus mounting frame is a cantilevered spring arrangement which is so designed as to limit the movement of the stylus mounting plate to a single plane without introducing any significant friction or backlash in the positioning operation. A damping means is provided which is adapted to prevent the occurrence of any sustained oscillatory movement of the stylus carriage arrangement. The damping means is sufficiently resilient, however, to have a negligent effect upon the servo drive means which urge the stylus through the plane of motion.

The stylus mounting is designed to have sufficient resiliency for the absorption of the stylus impact upon engagement of the stylus with the opaque slide. Solenoid means is provided to initiate the stylus engagement which solenoid means overcomes a resilient hinge arrangement to displace the stylus frame.

The opaque slide has an annular configuration the dimensions of which permit a plurality of separate scribes or plot to be scribed upon the slide.

The glass slide is treated with an opaque slide coating composition which provides better line definition, less stylus wear and freedom from skip. The annular slide is rotated by means of a servo operated turret mechanism which includes an indexing means for positioning the slides at predetermined angular positions. A second independently operated disc is provided with a variety of colored filters which serve to identify the plot portrayed by the projection means. The projection system includes a lens arrangement which is electromechanically positioned to correct for trapezoidal effects and for equalizing final image sizes of a plurality of projector systems which include a bank of a plurality of projectors concurrently portraying plots upon a screen. A blower is arranged to cool the projector elements and to remove the opaque coating residue produced during the scribing operation.

One of the opaque coatings employed in prior art devices consisted of a coating material of carbon black which is impressed in any well known manner upon a transparent substrate (i.e. glass). This was found to be highly impractical because lines scribed therethrough became jagged. This necessitates the employment of a protective lacquer which combination requires a large amount of power for driving the scribing stylus drive means.

This led to the development of the coating arrangement of the instant invention which is so adapted as to provide: a coating which is opaque and is easily removable by the stylus; requires substantially less power for the scribing operation in order to drive the scribe stylus; does not chip; is extremely thin; does not cause measurable stylus wear; and is relatively inexpensive in its manufacture.

The structure of the opaque slide consists of a glass (or equivalent) member which is employed for its advantageous features of transparency; hardness; optical flatness; and capability of being readily and simply coated. The coating arrangement consists of a first layer of a soft material which lends itself readily to a scribing operation; for removing the soft material from the substrate; a second layer which provides the necessary opaqueness and a third layer which acts as protective coating for the preventing of chemical and other harmful reactions.

The stylus driving means consists of a servo assembly responsive to a D.C. potential input. The output of the potentiometer transducer means which measures stylus position is compared with the input potential to accurately position the stylus. The resulting error voltage is chopped by an A.C. modulating means which serves to amplify the error voltage to a sufficient output level to drive the servo motor. This arrangement eliminates drift characteristics which are inherent in high gain D.C. amplifiers employed in prior art devices.

The turret containing the slide includes synchro generator means for sensing the turret angular position the output of which is employed to drive the turret motor. Detent means are also provided for accurately positioning the turret during the period in which the stylus is performing the scribing operation. The detent means is automatically disengaged during turret motion. The novel amplifying means employed to power the stylus driving means is multiplexed between the turret servo and the stylus position servo since the operation of the two servos cannot occur simultaneously. A push-button operated stepping switch is employed to control the turret servo and further to prevent the operation of the scribing solenoid means to prevent occurrence of the scribing operation during the time in which the opaque slide is being moved to a new position.

The projector system is adapted for direct connection with the output of any digital encoding means such as a digital computer. This direct connection is facilitated by the digital to analog converter means which converts the digital information taken from the computer output into a D.C. voltage level which is impressed upon the stylus positioning servos. The analog to digital converter employs a conversion network which permits the use of impedance means while at the same time providing an impedance arrangement which operates with minimum error and high switching accuracy.

A manually operable plotting means is provided which is designed to enable an operator to produce a plot with a specially designed writing stylus which generates binary coded decimal signals representative of the graph coordinates concurrently with the manual positioning of the writing stylus.

The manually operating plotting board which converts the manual plot into binary coded characters which are representative of the instantaneous coordinates of the graphic plot provides the input for the digital to analog converter means. The coordinates which are derived through the plotting system are also available for employment in a digital computer simultaneously with the impression of these binary coded coordinate values upon the stylus drive servos.

The manual plotting system is comprised of a plotting board having a matrix of insulated conductors which are pulsed in a sequential fashion. A stylus transducer which is contained in the plotting system writing stylus senses the presence of the pulses in the conductors nearest the transducer. The pulses are compared with a time reference which is representative of the conductors' coordinate position producing a binary coded output which is a measure of the writing stylus coordinate. This function is performed for both coordinate axes which causes the writing stylus to be uniquely located within the dimensions of the plotting board. The transducer within the writing stylus is designed to be sensitive to input pulse energy over an extremely small area of the board so as to produce highly accurate coordinate measurements.

The writing stylus serves the dual function of acting as the pulse sensing transducer and as a conventional pen which has the capability to produce a graphic plot upon a plotting board translucent overlay which enables the operator to continuously view the information during the writing period. The stylus writing fluid may however be of a non-smearing solvent erase type wherein the writing may be imprinted directly on and likewise erased directly from the plotting board surface. A coordinate grid is engraved in the writing board surface, which grid may be seen through translucent or transparent paper to facilitate the manual plotting by the operator. The plastic writing board has edge lighting means for operation in low ambient light levels.

The writing stylus is so designed as to pick up the pulses generated in the writing board conductor matrix regardless of the angular position of the writing stylus with respect to its longitudinal axis. Since the pulses for the X and Y coordinates of the conductor matrix do not occur concurrently only one pulse sensitive transducer need be employed in the stylus.

A rear projection system is employed for the portrayal of the graphic plots so as to avoid obscuring any of the projected plots to operators positioned behind the bank of projectors. The screen is formed of a special material which produces optimum diffusion of the image without undue light loss due to scattering.

It is therefore one object of this invention to provide a novel data projection system having a stylus suspension which limits movement of the stylus to a single plane without introducing any significant friction or back lash.

Another object of this invention is to provide a novel data projection system having a direct drive means for accurately positioning the scribing stylus while avoiding the introduction of back lash and hunting.

Still another object of the invention is to provide a novel servo arrangement in a data projection system which is so designed as to modulate the error signal prior to amplification thereof in order to eliminate undesirable amplifier drift characteristics.

Another object of this invention is to provide a data projection system having a novel means for concurrently producing a graphic plot and binary coded characters of the instantaneous coordinates of the graphic plot for controlling the projection system scribing stylus.

Another object of the invention is to provide a data projection system having a novel scribing stylus mounting means having a small inertia characteristic and which is able to withstand the stylus impact which occurs in the scribing mode.

Another object of the invention is to provide a data projection system having novel means for rapidly changing the projection system opaque slides.

Still another object of this invention is to provide a slide changing mechanism and direct drive mechanism for positioning the scribing stylus wherein the turret and direct drive mechanisms employ a single amplifier means which is multiplexed on a time sharing basis by all of said drive means.

Another object of our invention is to provide a data projection system having direct tape drive means for positioning the scribing stylus wherein the followup transducer is directly connected to the stylus drive means for providing a precise indication of the scribing stylus position.

Another object of my invention is to provide a data projection system having novel means for damping oscillatory vibrations of the stylus carriage system.

These and other objects of this invention will become apparent in considering the following description and accompanying drawings in which:

FIGURE 2 is an exploded view showing the components housed in the projector assembly of FIGURE 1.

FIGURE 3 is a perspective view showing the novel carriage suspension means shown in FIGURE 2 in greater detail.

FIGURE 4 is a perspective of the scribing stylus subassembly showing the stylus subassembly of FIGURE 3 in greater detail.

FIGURES 5 and 6 are perspective views of the vertical and horizontal suspension portions respectively of the suspension system shown in FIGURES 3 and 4.

FIGURE 7 is a schematic of our novel data projection system showing a bank of projectors of the type shown in FIGURE 1, and the control means thereof.

FIGURE 8 is a schematic diagram showing the manner in which the amplifier multiplexing operation is performed.

FIGURE 9 is a schematic diagram of the turret selector circuitry for operating the opaque slide turret means.

FIGURE 10 is a schematic diagram of one embodiment of the digital to analog conversion means employed in our novel data projection system.

FIGURE 12 is a schematic view of our novel data plotting assembly which is employed as the input control for the data projector assembly of FIGURE 1.

FIGURES 15a and 15b are top views of a portion of the stylus carriage assembly showing the stylus position in the normal undeflected and the displaced positions respectively.

FIGURE 16 is an oblique view taken along line 16–16' of FIGURE 15a.

FIGURE 17 is a block diagram of the servo mechanism assembly employed for positioning the stylus along one axis.

FIGURE 18 is a block diagram of the servo system of FIGURE 17 showing the transfer functions of the servo mechanism assembly.

FIGURE 19 is a diagram showing the wave form of the response of the servo mechanism assembly of FIGURE 18 to three step inputs.

FIGURE 20 is a schematic diagram of trapezoidal distortion occurring in the projection of a plot by the projector of FIGURE 1.

FIGURE 21 is a schematic showing a typical project or problem which is employed in analyzing the operation of our novel data projection system.

FIGURE 22 is a perspective view of a portion of the stylus holding plate assembly shown in FIGURE 2 showing the stylus assembly hinge spring in greater detail.

FIGURE 23 is a perspective view showing a portion of the vertical tape drive assembly of FIGURES 2 and 3 in greater detail.

FIGURE 24 is a close-up view of the turret assembly notched periphery shown in FIGURE 2.

FIGURE 25 is a schematic diagram of the turret positioning synchro assembly.

FIGURE 26 is a phantom view of the manually operable writing stylus of the data plotter shown in FIGURE 12.

FIGURE 27 is a cross-sectional view of the opaque slide taken along line 27–27' of FIGURE 2.

FIGURE 28b is an enlarged perspective view of a portion of the scribing stylus mounting of FIGURE 28a.

FIGURE 29 is a perspective view of the carriage damping means for the scribing stylus carriage of FIGURES 2 through 6.

Figure 1:
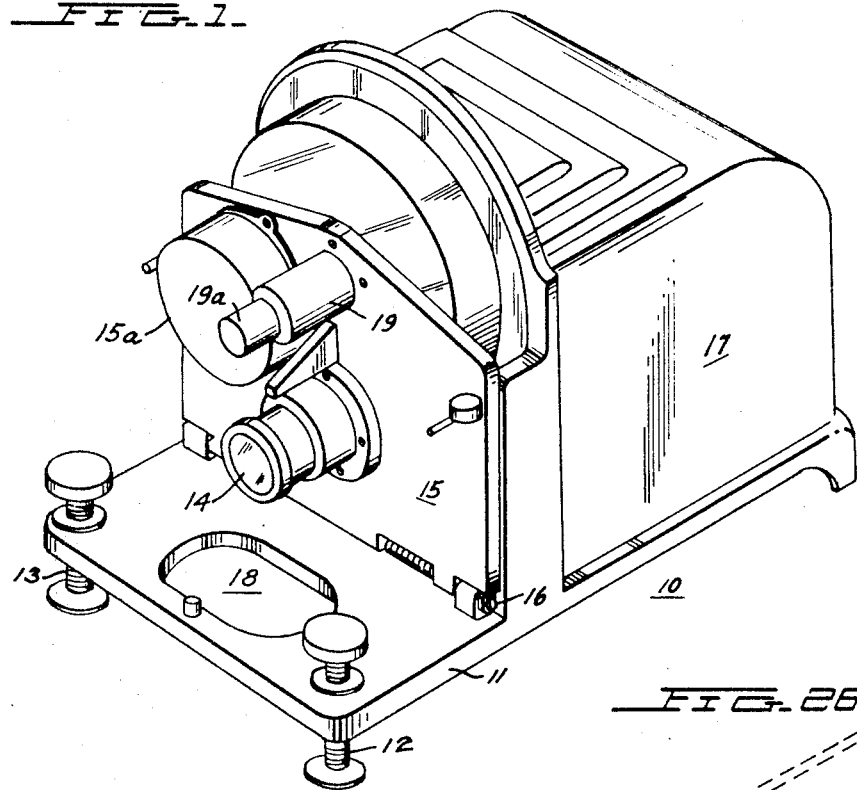
FIGURE 1 is a perspective view of the plotting projector assembly of our novel data projection system.

Referring now to the drawings, FIGURE 1 shows our novel data projector 10 which is comprised of a base member 11. The rear portion of base 11 has positioned thereupon a housing 17 which houses the stylus and stylus driving means which generates the plot to be projected. A front plate 15 which is pivotally mounted to base 11 by hinge means 16 has mounted thereto a portion 14 of the data projector lens system which is employed to project a sharp image upon the data projector screen (not shown). A pair of adjustable legs, 12 and 13, are mounted through associated tapped holes in base 11 to permit vertical alignment of the plot being projected. The cover plate 15 may be readily opened for the purpose of either inspecting or repairing the data projector interior for corrective or preventive maintenance. An aperture, 18 is provided in base member 11 to allow sufficient clearance for lense mount 14 during the opening operation, so as to protect the lens from breakage.

*Stylus Carriage Assembly*

FIGURES 2 through 6 portray views of the projector 10 shown in FIGURE 1 wherein the elements within the projector housing 17 are shown in an exploded arrangement. The projector scribing stylus 103 (see FIGURES 2 and 3) is resiliently suspended by a carriage assembly 20 which is comprised of a plurality of substantially U-shaped resilient members, 21 through 24, and 30 through 33. The first arms of members 21 through 24 are securely fastened to main plate 60 by means of blocks 21a through 24a. The ends 21b through 24b adjacent the blocks 21a through 24a are secured to outer frame 25 which is positioned in opening 60a of main plate 60, which plate has projections 60b and 60c which cooperate with blocks 21a through 24a secured to main plate 60 to permit vertical movement of outer frame 25 which is confined between projection 60b and 60c. The opposite ends 21c through 24c of resilient members 21 through 24 respectively are securely fastened to outer spring support 26, this portion of the stylus suspension assemblage produces, therefore, a cantilever suspension which is more clearly shown in FIGURE 5 for enabling outer frame 25 when properly driven, to cause deflection of the cantilever suspension arms, which arms are adapted to return to their initial undeflected positions upon removal of the driving force as will be more fully described.

An inner spring support 34 is operatively associated with outer frame 25 by means of U-shaped resilient members 30 through 33 respectively, which members have a first arm 30a through 33a securely fastened to outer frame 25, while the web portion 30c through 33c of each resilient member 30 through 33 respectively is securely fastened to inner spring support 34. The remaining arms 30b through 33b of each resilient member 30 through 33 respectively is securely fastened to inner frame 35. The arms 30a through 33a are exactly equal in length to their associated arms 30b through 33b respectively; and the arms 21a through 24a are exactly equal in length to the associated arms 21b through 24b respectively in order in insure that outer spring support 26 experiences one half of the vertical deflection experienced by outer frame 25 and that inner spring support 34 experiences one half of the horizontal deflection experienced by inner frame 35. While FIGURE 6 may give the impression that arm 31a is not equal to arm 31b, in actuality the arms are substantially equal.

A shaft 105 is positioned on the right-hand side of inner frame 35, which shaft physically links inner frame 35 to cross feed frame 45 by means of bearing block 46 and fasteners 46a. Cross feed frame 45 imparts horizontal movement to inner frame 35 for the purpose of moving the scribing stylus in a manner to be more fully described. The manner in which the shaft 105 is physically linked to the cross feed frame 45 can be seen by the phantom representation of shaft 105, adjacent frame 45 in FIGURE 2. It can be seen from this representation that any horizontal movement of cross feed frame 45 will be imparted to inner frame 35. Cross feed frame 45 is prevented from any vertical movement, however, as will be more fully set forth, so that any vertical movement which inner frame 35 experiences will not be transmitted to cross feed frame 45 since shaft 105 is not restrained from undergoing vertical movement within bearing block 46.

Tape Drive Assembly

The opposite ends of cross feed frame 45 are secured to sleeves 55 and 56 respectively, which sleeves are shown partially broken away in order to expose other elements of the data projector interior. Sleeves 55 and 56 are slidably engaged by sleeve retainers 54 and 57 respectively which sleeve retainers are provided with apertures for receiving the associated sleeves. This sleeve arrangement enables cross feed frame 45 to experience horizontal movement and to be restrained from any vertical movement. Sleeve retainers 54 and 57 are secured to the data projector housing 17 (see FIGURE 1) in any well known manner. A third sleeve retainer 52 has an aperture 53 which receives sleeve 55 for the purpose of securely fastening retainer 52 to sleeve 55. An adjusting screw 54a cooperates with a taped aperture 54b in sleeve retainer 54 for limiting the horizontal movement of cross feed frame 45 in one direction as will be more fully described. One end of a metal tape 50 is seated in a slit 52a of retainer 52 and is securely fastened therein. The opposite end of tape 50 is securely fastened to a pulley 51 by means of an anchor member 51a.

A second metal tape 49 is likewise secured to pulley 51 by anchor member 51a at a first end while the opposite end of metal tape 49 is securely fastened in a slit (not shown) of block 45a which is secured to cross feed frame 45. Pulley 51 is mounted to drive shaft 48 which is rotatably driven by torquer 47. A potentiometer type transducer 59 is operatively connected to torquer 47 by means of drive shaft 47a which transducer member 59, in response to rotation of drive shaft 47a (which rotates concurrently with drive shaft 47) provides the error signal for the servo mechanism apparatus (not shown) for rapidly and accurately controlling torquer 47. Torquer 47 is a D.C. motor which rotates drive shaft 48 in response to an input voltage which represents the horizontal or "x" coordinate to which the scribing stylus must be driven. The horizontal tape assembly which includes tapes 49 and 50 produce the necessary horizontal movement as will be more fully described.

The vertical movement of the scribing stylus is provided by a vertical tape assembly which is comprised of a tape 38 having its first end seated and securely fastened in slit 43a of block 43 which is in turn secured to inner frame 35. The opposite end of metal tape 37 is secured to pulley 40 by anchor member 40a. Metal tape 39 has a first end secured to pulley 40 by anchor member 40a and a second end secured to L-shaped member 42 (note especially FIGURES 2, 3 and 23). L-shaped member 42 has an adjusting screw means 42a which is engaged by taped aperture 42b. An elongated member 41 is securely fastened to outer frame 25 by fastening means 41a at its first or lower end while the upper end of member 41 abuts the lower tip (not shown) of adjusting screw 42a.

Pulley 40 is mounted to vertical drive shaft 37 which transfers rotational movement of the armature (not shown) of torquer 36 to pulley 40. A second shaft 36a connects potentiometer transducer 44 to the armature of torquer 36 for the purpose of developing the error signal to rapidly and accurately position the armature of torquer 36 in the same manner as described with respect to potentiometer transducer 59 and torquer 47 set forth previously.

The horizontal movement of inner frame 35 takes place as follows:

In response to an electrical input signal torquer 47 rotates horizontal drive shaft 48 in either the clockwise or the counterclockwise direction, as shown by arrows 110 and 111 respectively, depending upon the polarity of the input signal to torquer 47.

Assuming that the polarity of the input signal impressed upon torquer 47 causes torquer 47 to drive shaft 48 in the clockwise direction 110, this causes metallic tape 49 to be drawn in the horizontal direction shown by arrow 113, under control of pulley 51. The movement of metallic tape 49 in the direction of arrow 113 draws cross feed frame 45 in the same direction. Sleeves 55 and 56 which are secured to the right and left hand edges of cross feed frame 45 respectively are both urged in the direction shown by arrow 113. Movement in the direction of arrow 113 is limited by fixed sleeve retainer 54 in the following manner: Sleeve retainer 53 being fixedly secured to sleeve 55 was driven along the sleeve 55 in the direction shown by arrow 113 until the right hand face of retainer 53 abuts against the tip of screw member 54a. In this position further movement of cross feed frame 45 is prohibited. Metallic tape 50 is kept taut due to the fact that it is firmly secured to sleeve retainer 53, thus causing the metallic tape 50 to remain taut even though it is being unwound from pulley 51.

The bearing block 46, which mechanically links cross feed frame 45 to inner frame 35, causes the horizontal movement of cross feed frame 45 to be imparted to inner frame 35 thus, moving it to the position shown in FIGURE 6. The resiliency of the cantilever members 30 through 33, coupled with the means for keeping the metallic tapes 49 and 50, in a taut position serve to cancel all back lash between the drive shaft 48 and the frame 35. Upon the removal of the electrical signal from torquer 47 the cantilever members 30 through 34 serve to reset the cross feed frame 45 to its normal rest position due to the action of the cantilever members 30 through 34, returning from their deflected position shown in FIGURE 6 to the normal undeflected position shown in FIGURES 2 and 3. FIGURES 15a and 16 which are top views of the scribing stylus suspension show the U-shaped members 30 through 33 in their normal undeflected position.

For movement of the cross feed frame 45 in the reverse horizontal direction shown by arrow 112 in FIGURE 3, drive shaft 48 rotates counterclockwise as shown by arrow 111, causing metallic tape 50 to be wound in the counterclockwise direction about pulley 51 thus drawing the right hand end of metallic tape 50 in the direction shown by arrow 112. The movement of metallic tape 50 is imparted to retainer sleeve 53 which in turn imparts the movement to sleeve 55 driving cross feed frame 45 in the direction shown by arrow 112. Sleeves 55 and 56 act as guiding members to limit any sidewise or vertical movement by cross feed frame 45. Tape 49 is kept taut due to the fact that it is securely fastened to block 45a mounted upon cross feed frame 45 which keeps metallic tape 49 taut even though it is unravelling from pulley 51.

FIGURE 15b is a top view of the scribing stylus suspension assembly presently under discussion, wherein member 35' schematically represents both cross feed frame 45 and inner frame 35 which has stylus 103 mounted thereto. The stylus 103' in FIGURE 15b represents the normal or undeflected position of the scribing stylus and the stylus 103 of FIGURE 15b represents the right hand horizontal movement of the frame 35' under control torquer 47 shown in FIGURES 2 and 3.

Because the deflection characteristics of all spring arms are identical the distortion described by all four spring arms is identical or sufficiently identical to assure that the following distances are equal; $h_a$ of spring arms 32c and 33c (see FIGURES 15b and 16);

$h_c$ of spring arms 32d and 33d;
$h_b$ of spring arms 30c, 31c;
$h_a$ of spring arms 30d, 31d.

This assures that the motion of the stylus bearing assembly 35' as shown in FIGURES 15a and 15b and 16 and its associated stylus will follow a prescribed straight line, parallel to the rigid projector frame surfaces 25.

It should be noted that horizontal movement of cross feed frame 45 and inner frame 35 in either horizontal direction is not imparted to outer frame 25 which is linked to inner frame 35 by U-shaped spring members 30 through 33, since outer frame 25 is prevented by any horizontal movement due to the presence of guide projections 60b and 60c in the opening 60a of main plate 60.

Vertical movement of inner frame 35 takes place as follows:

Vertical drive shaft 37 rotates either clockwise or counterclockwise as shown by arrows 115 and 116 respectively under control of torquer 36 which drives shaft 37 in the appropriate direction depending upon the polarity of the voltage signal pressed upon the torquer 36.

Assuming first that the vertical drive shaft 37 is rotated in the clockwise direction as shown by arrow 115 this causes metallic tape 39 to be wound around pulley 40 thus driving the upper end of metallic tape 39 in the direction shown by arrow 117. This operation can best be seen in FIGURES 2, 3, and 23. The movement of metallic tape 39 in the direction shown by arrow 117 urges L-shaped member 42 in the same direction causing the lower tip of adjusting screw 42a to abut against elongated member 41 which is attached to outer frame 25 by fastening members 41a. This drives elongated member 41 and outer frame 25 in the direction shown by arrow 117. The spring members 21 through 24 which are fastened in a cantiliver suspension arrangement of the same nature as spring members 30 through 33, are urged in a deflected position in the same manner as is shown with respect to spring members 30 through 33 in FIGURES 15a, 15b, and 16. The arms of each spring member 21 through 24 deflect in the same manner as is shown in FIGURE 15b, so as to limit the vertical movement of outer frame 25 to a plane which is parallel to main plate 60, or in other words, preventing outer frame 25 from exhibiting any movement other than that in the upward or downward vertical directions.

The vertical deflection in the direction shown by arrow 117 is transmitted to inner frame 35 in the following manner:

The upper arms 31d and 32d of spring members 31 and 32, and the lower arms 30d and 33d of spring members 30 and 33 are secured to frame 25 at ends 30a through 33a respectively. It can clearly be seen in FIGURES 2 and 3 that spring members 30 through 33 are aligned perpendicularly to spring members 21 through 24 so that spring members 30 through 33 are substantially prevented from experiencing any deflection whatsoever in the vertical direction shown by arrow 117. Thus the vertical movement of outer frame 25 in the downward vertical direction shown by arrow 117 is directly imparted to inner spring support 34 which moves downward in the direction of arrow 117, a distance equal to the deflection which outer frame 25 experiences. The shorter arms 30e through 33e of spring members 30 through 33 respectively are securely fastened at their ends 30a through 33a to inner frame 35 which experiences a deflection of the same distance experienced by inner frame 34. The downward vertical movement of inner frame 35 causes metallic tape 38 to be moved downward in the direction of arrow 117 due to the fact that it is securely fastened to block 43a which in turn is secured to inner frame 35. Thus although the clockwise movement of pulley 40 as shown by arrow 115 serves to unravel metallic tape 38 from pulley 40, metallic tape 38 remains taut throughout the positioning operation due to the downward movement of inner frame 35.

No vertical movement whatsoever is experienced by cross feed frame 45 since bearing block 46 permits shaft 105 of inner frame 35 to slide freely in the upward or downward vertical directions within the confines bearing block 46. It can therefore be seen that the cross feed frame 45 imparts horizontal movement to inner frame 35 without experiencing any vertical movement due to the bearing block arrangement 46, which acts as a buffer means to prevent vertical movement to cross feed frame 45 under control of torquer 36.

When torquer 36 (which may be of the same type as torquer 47) drives vertical drive shaft 37 in the counter clockwise direction this causes metallic tape 38 to be reeled in by pulley 40 causing the lower end of metallic tape 38 to move upward in the direction shown by arrow 118 (see FIGURE 23). Due to the perpendicular alignment of spring members 30 through 33, with respect to spring members 21 through 24 and the direction of movement shown by arrow 118 all upward vertical movement of inner frame 35 is imparted to inner spring support 34 and in turn to outer frame 25 by means of spring arms 30e through 33e and 30d through 33d respectively. The ultimate upward vertical movement of outer frame 25 in the direction shown by arrow 118 under control of torquer 36 urges elongated member 41 in the same upward direction causing the upper edge of member 41 to abut the lower edge of adjustable screw 42a which likewise drives L-shaped member 42 in the upward direction. This upward movement of L-shaped member 42 keeps metallic tape 29 taut, even though the tape is being unravelled from pulley 40 which is moving in the counterclockwise direction shown by arrow 115. Thus it can be seen that the vertical tape assembly and taut drive means eliminates all backlash between torquer 36 and inner frame 35.

The vertical tape assembly and accompanying spring members 21 through 24 return from their deflected position to which they were moved to their normal undeflected position upon removal of the voltage to the input of torquer 36 which operation takes place in the same manner as set forth with respect to the horizontal tape assembly previously described.

Carriage Damping Control Assembly

In order to prevent oscillatory movement of the scribing stylus 103, damping means are provided between the inner spring support 34 and the outer spring support 26 and the projector housing 17 which act to smooth the abrupt movement of the cross feed frame and to prevent any sustained oscillatory motion. The horizontal damping means takes the form of a pair of projection springs 500 and 501 which are secured to the housing 17 at their first ends 500a and 501a and are secured to horizontal damping control bar 502 at their opposite ends 500b and 501b. These joints are cantilevered suspensions to permit flexing of springs 500 and 501 as will be more fully described. The lower edge 502a of damping control bar 502 is notched for engagement with pinion 503 to form a rack-pinion assembly the function of which will be more fully described.

Horizontal damping control member 502 is provided with an eyelet 502b for slidably receiving bar 503 which is secured at its upper and lower ends by projections 34a and 34b on inner spring support 34. Although control member 502 is restrained from movement in the horizontal direction the eyelet 502b permits inner spring support 34 to experience movement in the vertical direction as shown by arrows 504.

The rack-pinion assembly 502–503 has a gear ratio which is adapted to move damping control member 502 one half of the horizontal distance which the inner frame 35 experiences. The reason for this is that when the spring member, such as the spring member 31, is deflected by the drive torquer 47 such that its ends 31a and 31b separate by the distance $D_1$ when the end 31c of arm 31 is deflected a distance $D_z$ away from end 31a where $$D_z = Y_z D_1$$

Thus it can be seen that pinion 503 which is driven by torquer 47 must drive control member or rack 502 one half of the distance it drives inner frame 35 by means of pulley 51 and tape members 49 and 50.

The vertical damping control assembly is comprised of rack pinion members 505 and 506 respectively wherein the gear ration of the rack-pinion assembly 505–506 is adapted to cause torquer 36 to drive vertical damping control member 505 exactly one half of the distance which the outer frame 25 (see FIGURES 2 and 3) is moved by vertical tape assembly 38–39 for the same reason as that set forth above with respect to the design of the horizontal damping assembly.

*Scribing Stylus Sub Assembly*

The scribing stylus 103 is rigidly mounted between two parallel arranged glass plates 101 and 102. Because the plates are extremely thin they serve as resilient members which act as a cushioning means for the absorption of the stylus impact created in the scribing mode. Two glass plates 101 and 102 are employed in order to provide adequate support for the scribing stylus 103 while at the same time providing sufficient resiliency under the impact created during the scribing operation. Glass plates 101 and 102 are positioned and secured by vertically aligned members 99 and 100. Member 99 is provided with two vertical slots 99a and 99b and member 100 is provided with two like vertical slots (not shown) for slidably engaging the left and right hand edges respectively of glass plates 101 and 102. The members 99 and 100 are secured to a frame 91. Plates 101 and 102 are cemented to the grooves in members 99 and 100 respectively in any well known manner.

The preferred, transparent resilient stylus mounting (see FIGURE 4) has the two parallel transparent resilient members 101, 102 (glass, quartz or plastic) mounted at their periphery to members 99 and 100 secured to frame 91, and being substantially parallel and a predetermined distance apart from each other. The stylus 103, which is fastened to the two transparent resilient members at a point near their centers, is of minimum mass. The stylus 103 passes through the members 101 and 102 in the same manner as the stylus 103″ of FIGURE 28b passes through the lens 557. The stylus 103 is then cemented or secured to the members 101 and 102 in any suitable manner. The thickness of the two transparent resilient members is chosen so that their desired deflection results in the stylus pressure necessary to scribe in the opaque medium. Making the stylus mass and that of the transparent, resilient members a minimum, results in a minimum impact pressure when the stylus is suddenly brought into contact with the slide to be scribed. This impact pressure results from decelerating the mass of the stylus and that part of the transparent, resilient members which move with the stylus.

To insure long stylus life it is important to keep this impact pressure to a minimum and also to make the opaque coating soft, which will require a minimum of scribing pressure on the stylus.

A substantially L-shaped member 92 (see FIGURE 22) is firmly secured to the lower edge of inner frame 35 in any well known manner. A hinge spring 93 is positioned with its lower edge being adjacent the lower edge of substantially elongated L-shaped member 92 and is secured between a plate 94 and member 92 by fastening means 94a. The upper half of elongated hinge spring 93 is positioned between the lower edge of frame 91 and elongated plate 95 and is firmly secured to members 91 and 95 by fastening means 95a. This arrangement provides a cantilevered suspension for frame lever 91.

The upper portion of frame 91 which is otherwise free to rotate about hinge spring 93 is urged against the face of inner frame 35 by a spring 98 which is secured at a first end to inner frame 35. The opposite end of spring 98 abuts a tubular projection 91a on frame 91 urging frame 91 against the adjacent face of inner frame 35. In this position the scribing stylus is approximately 8 to 15 thousandths of an inch away from the opaque slide member 7 which is to be scribed upon, which operation will be more fully described. This detached position which is shown most clearly in FIGURES 2, 3 and 4 enables the annular slide 71 (see FIGURE 2) to be rotated to its next scribing position free of any engagement with scribing stylus 103.

A solenoid 96, which is controlled in a manner to be more fully described, operates frame 91 between the detached position shown in FIGURE 3 and the scribe position (not shown) under control of the appropriate electrical signal. The solenoid plunger (not shown) is coupled to a shaft 93a which extends the vertical height of inner frame 35 and which is securely fastened at its upper end to a solenoid lever 97 which rotates with shaft 93a as its pivot under control of the solenoid plunger.

The movement of the scribing stylus 103 from the detached position to the scribing position is as follows:

Upon energization of solenoid 96, solenoid lever rotates clockwise about shaft 93a as shown by arrow 120 causing the free end of solenoid lever 97 to abut against the top portion of frame 91. The force exerted by solenoid lever 97 is sufficient to overcome the holding force of spring 98 and hinge spring 93 (see FIGURE 22) so as to cause frame 91 to experience rotation about hinge spring 93. The upper portion of frame 91 is driven away from the adjacent face of inner frame 35. As previously described scribing stylus 103 is approximately 8 to 15 millimeters away from the surface of the opaque slide 71 (see FIGURE 2) so that the D.C. solenoid 96 displaces frame 91 this distance in order to bring scribing stylus 103 into contact with the opaque surface of slide 71. Upon deenergization of D.C. solenoid 96 the spring constant of hinge spring 93 and spring 98 urges frame 91 back into engagement with the adjacent face of inner frame 35.

Figure 28B:
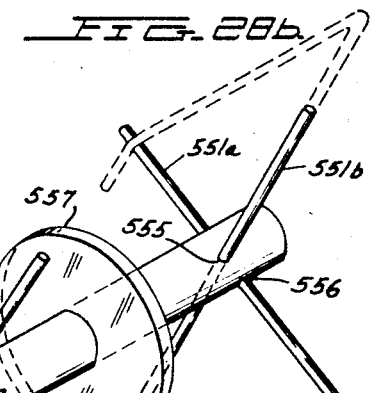
Figure 28A:
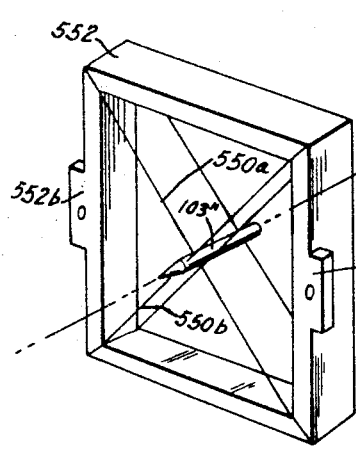
FIGURE 28a is a perspective view of a preferred embodiment of the scribing stylus mounting means.

Another preferred embodiment of the scribing stylus mounting 90 is shown in FIGURES 28a and 28b wherein the glass mounting plates 101 and 102 are replaced by wire members 550, 551 which are securely fastened to the diagonal corners of the scribing stylus frame 552. The wire members 550 and 551 exhibit sufficient resiliency to absorb the impact imparted to scribing stylus 103″ upon engagement of the stylus with the opaque slide 71 and yet is sufficiently rigid to prevent any motion in the plane of the frame 552.

The wires 550 are secured to the diagonal corners of the frame 552 and are threaded through apertures 553 and 554 of stylus 103″. Since wires 550a and 550 are mutually perpendicular their cooperative effect prevents any movement of stylus 103″ in the plane of the wires 550a and 550b. This arrangement avoids the necessity of fixedly securing the stylus 103" to the wires 550a and 550b thus simplifying the manufacture of the stylus suspension of FIGURES 28a and 28b. The wires 550 and 551 may, however, be secured to stylus 103" in the plane of frame 552.

The wires 551a and 551b cooperate with apertures 555 and 556 respectively, in the same manner as wires 550a and 550b thus serving to secure both ends of stylus 103".

FIGURE 28b shows a lens 557 having an aperture 557a for receiving stylus 103". The lens, which is optional, is employed for the purpose of distinguishing the traces of different projectors in a system employing a plurality of projectors such as the system shown in FIGURE 7.

Turret Wheel Assembly

The turret wheel assembly 70 of FIGURE 2 contained within the housing 17 of data projector 10 consists of an opaque coated annular glass ring 71 which has sufficient area along a one inch annular section to permit the scribing of 20 separate one inch by one inch areas. This slide is removably fastened to a turret 72. Shafts 76 and 77 cooperate with shaft housing 19, which is secured to projector front plate 15, for the purpose of providing a cantilevered rotatable shaft arrangement. Shaft 76 is pressure fitted within portion 19a of housing 19 while shaft 77 has an outer dimension which is less than the inner dimension of housing 19 so as to permit shaft 77 to rotate about shaft 76 and to be vertically positioned with respect to projector front plate 15 by means of housing portion 19a of housing 19.

Rotatable turret wheel 72 is urged into rotation by turret drive torquer 73 which imparts rotational movement to turret 72 by means of drive shaft 74, gear member 75 and cooperating gear member 72a which is secured to turret wheel 72. Torquer 73 is of the same type as torquers 36 and 47 described previously. Thus, upon appropriate energization of turret drive torquer 73, turret wheel 72 is driven either counter clockwise or clockwise to position the next one inch by one inch area to be scribed adjacent to the scribing stylus 103.

In order to insure accurate angular alignment of turret wheel 72 and likewise slide member 71 a solenoid assembly 78 is provided which assembly has a detent for both assuring accurate angular alignment and for locking the turret wheel 72 to prevent angular movement of the turret wheel during the scribing operation. This operation is performed as follows:

Upon rotation of turret wheel 72 under control of torquer 73 and the connecting shaft and gears 74, 75, and 76 respectively, turret wheel 72 is driven to the next scribing position. A plurality of inverted key-shaped slots 79 are provided around the periphery of turret wheel 72 for engagement by detent member 81 of the solenoid assembly 78. The faces 80 of slots 79 which are adjacent the periphery of turret wheel 72 flare outwardly so as to provide a substantially wide opening for detent 81 upon movement of turret wheel 72 to the approximate angular position for the next one inch by one inch scribing area. Solenoid 78 is energized in a manner to be more fully described causing detent 81 to enter the slot 79. The detent 81 has a tapered profile which upon substantial insertion into the slot 79 causes the sides of the tapered detent 81 to abut the flared surfaces 80 of the slot 79 thus bringing turret wheel 72 into accurate angular alignment. An electronic circuit to be more fully described multiplexes the operation of turret drive torquer 73 and solenoid 78 so that detent 81 is not seated in one of the slots 79 at the instant when turret wheel 72 is being rotated by turret drive torquer 73.

In order to provide color selection requirements for each scribing area of glass slide 71, a color wheel 82 is provided which wheel is mounted for rotation upon turret wheel 72 and is provided with just one filter member 83. If desired the single filter 83 may be replaced by a plurality of filters which are provided around the periphery of color wheel 82 in order to produce projections having different trace colors. The color wheel 82 of FIGURE 2, for example, may be provided with six color filters each of a different color, an opaque filter and a transparent filter represented by the areas 83a through 83h respectively. Since in this embodiment only eight lenses 83 are provided, turret drive torquer 73 may be modified to drive turret wheel 72 into only eight discrete angular positions, and likewise the number of plots 79 may be limited to 8 in such an embodiment. It should be understood however, that the number of lenses 83 provided in the color wheel 82 may be greater or fewer than 8 depending upon the application of the individual projector. In addition color wheel 82 may be provided with one annular filter having a configuration 83 as shown in FIGURE 2 wherein applications requiring a bank of data projectors of the nature of data projector 10 each data projector may have a different colored filter to distinguish it from the other projectors in the projector bank as opposed to having colored filters which distinguish each graph of one data projector from the other graphs of the same data projector. This function may also be provided by placing a color filter over lens assembly 14 to avoid the need for an annular shaped color filter 83 as shown in FIGURE 2.

Projection System

The projection system consists of a xenon-mercury arc lamp (or other suitable) light source 63 (see FIGURE 2), a condensing lens system 61 located within the stylus frame mechanism and 62 located behind the frame mechanism, an objective lens 14 located in front of the slide turret (see FIGURE 1) and a blower means 65. The blower means 65 cools the projector elements and provides a stream of air which circulates within the projector housing to remove the opaque coating residue produced during the scribing operation.

Projector Servo System

The electronics portion of the horizontal and vertical tape drive assembly is set forth in FIGURES 17, 18 and an oscillogram as shown in FIGURE 19 is provided to explain the operation thereof. The components of the servomechanism arrangement shown in FIGURES 17 and 18 are represented diagrammatically for purposes of clarity.

The input signal is a command D.C. potential wherein the magnitude of the voltage input controls the amount of deflection of the stylus and the polarity of the input voltage controls the direction of deflection of the stylus, from its rest position. The command signal is impressed upon input terminal 211 (see FIGURE 17) which is the input to the comparison circuit 201. The input command signal is compared with an output signal from potentiometer transducer 44' impressed upon input terminal 217 of error detector 201 so as to produce an error signal ($\theta_e$). The error signal ($\theta_e$) is transferred from the output 48 of comparison circuit 201 to the input of error detector circuit 202 which amplifies the output signal ($\theta_e$). The resulting D.C. error signal ($\theta_e$) is fed through a passive shaping or compensation network 203 which consists essentially of lead-lag networks, which consists of resistors and capacitors in a predetermined arrangement. The signal is then impressed upon chopper or modulator circuit 204 which chops (modulates) the signal at a 2 kilocycle rate under control of modulating source 205 which is a local oscillator. The output of chopper 204 is impressed upon the input terminal of wide band A.-C. amplifier circuit 206. The amplitude of the signal impressed upon A.-C. amplifier 206 is proportional to the error ($\theta_e$) and the phase (zero, 180°) is a function of the polarity of the D.-C. error.

The resulting 2 kilocycle signal is then amplified in high gain A.C. amplifier 206 which maintains the phase and amplitude integrity of the input signal. The resulting output signal is demodulated in solid state demodulator circuit 207 which is keyed to the same 2 kilocycle frequency emanating from the local oscillator source 205. The resulting polarity reversing D.C. output voltage emanating from synchronous demodulator 207 is an amplified version of the D.C. signal fed into chopper means 204. The employment of the carrier system which includes the modulating and demodulating operations eliminates harmful drift characteristics which are inherent in high gain D.C. amplifiers.

Ultimate power amplification is accomplished in the solid state D.C. amplifier circuit 208. Although the drift characteristics are inherent in a D.C. amplifier of this nature it is not critical in the circuit of FIGURE 17 because the voltage levels at the input of the D.C. amplifier 208 employed here are quite high. For example, in the preferred embodiment of FIGURE 17, the input voltage to D.C. amplifier 208 is approximately 2 volts. The two kilocycle power requirements for the chopping and demodulation operations are obtained from an oscillator of the solid state variety.

The amplifier output from D.C. power amplifier 208 is impressed upon the armature (not shown) of torquer 36' (see FIGURE 17) which is the schematic representation of torquer 36 shown in FIGURES 2 and 3. The impression of the D.C. signal upon the armature of D.C. torquer 36' causes the shaft 37 (which operatively connects D.C. torquer 36' to the stylus 103") to rotate in order to deflect stylus 103" to the appropriate vertical position. Shaft 36a which is fixedly secured to and which rotates concurrently with the armature (not shown) of D.C. torquer 36' and shaft 37 respectively, rotatably drives potentiometer transducer 44' which is the schematic representation of potentiometer transducer 44 shown in FIGURES 2 and 3. The rotation of transducer 44' generates a D.C. output voltage theta sub zero ($\theta_0$) at its output terminal which signal is fed back through line 212 to the input terminal 217 of comparison circuit 201. Considering FIGURES 2, 3, and 17 the operation of the vertical shaft assembly servo mechanism is as follows:

The D.C. command signal is impressed upon input terminal 211 of comparison circuit 201 which signal is amplified at 202 phase compensated by means of network 203 and subsequently modulated or chopped in chopper 204 under control of local oscillator 205. The output of chopper 204 may now be amplified by A.C. amplifier 206 which has wide band frequency characteristics as previously described. After appropriate amplification the output of amplifier 206 is impressed upon a demodulator circuit 207 which is likewise under the control of local oscillator 205. The output of synchronous demodulator 207, which is an amplified representation of the input to chopper circuit 204, is impressed upon D.C. power amplifier 208, for further amplification prior to impression of the signal upon D.C. torquer 36'. Energization of D.C. torquer 36' causes concurrent rotation of both shafts 37 and 36a whereby shaft 37 urges stylus 103" to the appropriate vertical coordinate position (under control of the tape drive assembly) while shaft 36a drives potentiometer 44' to a position representative of the vertical position of stylus 103". The physical rotation of potentiometer 44' generates a D.C. potential proportional to the angular alignment of shaft 36a which D.C. potential is fed through line 212 to the input 217 of comparison circuit 201. The output signal theta sub zero ($\theta_0$) is then compared against the input signal theta sub I ($\theta_i$) to establish an error signal theta sub e ($\theta_e$) if such exists, for further repositioning of stylus 103" under control of D.C. torquer 36'. This operation proceeds in a continuous fashion and does not terminate until the input signal theta sub i ($\theta_i$) impressed upon input terminal 211 is subsequently removed. It should be understood that the servo mechanism system of FIGURE 17 is employed for operation of D.C. torquer 36 in order to provide the vertical positioning of scribing stylus 103" and that a second servo-mechanism system identical to the servo mechanism 200 of FIGURE 17 is required for horizontal movement of scribing stylus 103". The operation of the horizontal servomechanism assembly (not shown) is identical in every respect to the servomechanism assembly 200 of FIGURE 17. It should be understood, therefore, that a second servomechanism system identical to that shown in FIGURE 17 is associated with the horizontal tape drive assembly in the same manner as the servo mechanism assembly 200 as associated with the vertical tape drive assembly shown in FIGURES 2 and 3. A D.C. torquer motor is employed in the preferred embodiment since it adequately provides the required torque without the use of gears and is further advantageous for the reason that the direct tape drive assembly alleviates the inherent disadvantages of gear drive such as back lash, high speed shafts etc. The direct drive torquer has extremely fast response capabilities to step inputs and the torque-to-inertia ratio at the load (which is also commonly known as the acceleration factor) is approximately 20 times greater than the equivalent servo-motor gear trains.

A comparison of the performance characteristics of the servomechanism assembly of the instant invention with respect to servo motors employing gear trains is as follows:

(1) For the direct drive torque assembly:

Torque Available at Load=163 oz. in.
Equivalent Inertia at Load=.046 oz. in. —sec.$^2$ $$\alpha = \frac{T}{J} = \frac{163}{.046} = 3.520 \text{ rad./sec.}^2$$

(2) Using a standard Size 10 two phase servomotor and a gear train.

For the motor:
Nominal Maximum Torque=0.6 oz. in.
Nominal Acceleration Factor=50,000 rad./sec. 2.

(3) In order to produce the same load torque as the D.C. torquer, the required gear ratio is:

$$N = \frac{163}{0.6} = 270:1$$

∴ Available acceleration factor at load is:

$$\alpha = \frac{50,000}{270} = 185 \text{ rad./sec.}^2$$

$$\frac{\text{Torquer } \alpha \angle}{\text{Servomotor } \alpha \angle} = \frac{3,520}{185} = 19$$

The torquer chosen in our preferred embodiment further provides a very large torque factor within the allowable physical space. Thus, if necessary, a larger carriage than that employed in our preferred embodiment can be driven with adequate performance within the same allotted space.

In order to obtain large voltage amplification without the introduction of drift and time constant problems the D.C. error signal ($\theta_e$) (see FIGURE 17) is modulated, amplified and converted back to D.C. in a synchronous demodulator as set forth previously above. Phase coherence is maintained in both modulator and demodulator units 204 and 207 respectively, hence they are driven from the same local oscillator source 205. A frequency of two (2) kilocycles was chosen so that a negligible time constant will provide adequate filtering of the full wave ripple in the demodulator circuit 207. The compensation network required for the stability of the servomotor, such as the servomotor 36' of FIGURE 17 is utilized in the D.C. path so that simple resistors and capacitors may be employed as designated by numeral 203.

Static Accuracy (Repeatability)

For existing servo:
$K_{electronics}$ = voltage gain from input command to torquer = 130 volts/volt
$K_{pot}$ = input scale factor
= 60 volts/150 degrees
= 0.4 volts/deg.
$K_{ep}$ = forward loop gain = $(K_{elect})(K_{pot})$
= 130 volts/volt × 0.4 volt/degree
= 52 volt/deg.

Motor Breakway Torque = 0.013 lb.-ft.

Assume the load adds in equivalent striction = 0.013 lb. ft.

Motor Torque Constant = 0.31 lb.-ft./amp.

Breakaway Current $I_b \frac{0.013 + 0.01\ 3\ lb.-ft.}{0.31\ lb.-ft./amp.}$ $= \frac{.026}{0.31} = 0.084$ amps.

for R
Torquer = 10.5 Ω

Breakaway Voltage = 0.90 v.

∴ Stiction $= \frac{0.90\ v.}{52\ v./deg.} = .0173$ deg. 1.0 minute arc

For a total displacement of 150 deg. (equivalent to 1″ of stylus motion)

Resolution $= \frac{1.0\ min.}{150\ deg.} = \frac{1}{150\ (60)}$
$= \frac{1}{9000}$ Repeatability $= \frac{1}{4500}$ Since the desired repeatability $= \frac{1}{2000}$ servo has a safety factor greater than 2 (in case of additional stiction).

Dynamic Requirements

The scribing stylus is required to undergo total displacement (one inch equals 150°) within 0.250 seconds. This means that the torquer has to accelerate to full speed, slow at full speed, and stop at the desired position with minimum overshoots within the required time. The oscilloscope wave form 220 plotographically as shown in FIGURE 19, shows the servos response to 3 step inputs. It can be seen that there is only one overshoot, as peak 221 occurs, 100 milliseconds after application of the input command. The overshot is less than 7% of the total input value.

Servo Transient Analysis

In the block diagram of FIGURE 18 the gains of the servo assembly 200 shown in FIGURE 17 have been joined at the one gain factor and the block diagrams of FIGURE 17 are replaced with the block diagrams which represent the transfer functions of the servo assembly 200 of FIGURE 17.

The D.C. torquer 36′ is represented mathematically as follows:

(1) Input Current $(I)$ $= \frac{\text{Applied Voltage } (V) - \text{Back EMF } (E)}{\text{Impedance } (R+sL)}$ (2) Developed Torque $= T = K_T I = J s^2 \theta_o$ (3) Back E.M.F. $(E) = K_e s \theta_o$ Solving for the output angle over the input voltage, we get:

$$\frac{J s^2 \theta_o}{K_T} = \frac{V - K_e s \theta_o}{R + sL}$$

$$\frac{\theta_o}{V} = \frac{K_T}{s} \times \frac{1}{JLs^2 + JRs + K_T K_E}$$

$$\frac{\theta_o}{V} = \frac{1/K_e}{s\left[\frac{JLs^2}{K_t K_e} + \frac{JRs}{K_t K_o} + 1\right]}$$

Factoring the above equation:

$$\frac{\theta_o}{V} = \frac{K_m}{s(1+sT_m)(1+sT_e)}$$

$K_m$ = motor velocity scale factor $= 2\frac{(rad./sec.)}{volt}$ $T_m$ = mechanical time constant = 1/56 (sec.)
$T_e$ = electrical time constant = 1/600 (sec.)

For the torquer and load used:

$$\frac{\theta_o}{V}(s) = \frac{2}{s(1+s/56)(1+s/600)}$$

$$K_v = 6000 \frac{rad./sec.}{rad.}$$

With the proper selection of time constants in the compensation network represented by block 213, it was possible to obtain a highly stable servo (damping ration and phase margin are orthodox) and a swift response capability to step inputs which is the primary requirement of the system.

Turret Synchro Assembly

The turret wheel 72 of FIGURE 2 is positioned by motor 73 which is identical in design to the D.C. servomotor employed in the horizontal and vertical tape drive assemblies shown in FIGURES 2 and 3. The angular position of the turret wheel 72 is sensed by a synchro means 230 (see FIGURE 25) which is operatively connected to turret wheel 72 in any well known manner. The output of synchro 230 is impressed upon a resistance delta circuit 231 in a manner such as that set forth on pages 341–343 of the McGraw-Hill Publication Servo Mechanism Analysis by Thaler and Brown copyright 1953 which discusses the preparation and application of synchro motors and generators of this general description. The output of the resistance delta circuit 231 is amplified at amplifier 232 to present a signal to servomotor 273 of sufficient amplitude to drive turret wheel 72 through the mechanical linkage 74, 75, and 72a. The turret is accurately positioned by the detent 81 which is selectively engaged and disengaged by solenoid 78 as previously described. Since the servomotor employed to position the turret is of the same type as the torquer motors used to position the scribing stylus, this allows the electronic circuitry employed for stylus positioning functions to serve the added function of positioning the turret wheel as will be more fully described.

The amount of rotation experienced by the rotor (not shown) of the motor 73 is determined by the switch means 267 which is the control panel employed to select the desired angular portion of the slide 72 to be scribed. The switch means controls a variable resistive member (not shown) the impedance of which determines the amount of rotation the rotor experiences.

Projector Multiplexing Circuit

The scribing stylus need not be positioned while the turret wheel is undergoing rotation since the time necessary to position the turret is negligible and thus no significant operating time is lost during the slide changing operation. The multiplexing circuitry is shown in FIGURE 8 wherein the turret error signal from rectifier 251c which is generated by the turret error signal means 251a shown in FIGURE 8, is connected via rectifier 251c to one terminal of a relay coil 252 whose other terminal is connected to a positive voltage source such as for example +28 volts. The relay coil 252 operates four different pairs of two position contacts 252a through 252d respectively. The operation of the amplifier multiplexing function is as follows:

Upon the occurrence of an error signal from the generator synchro bridge 231 (FIGURE 25) the error signal represented by block 251a of FIGURE 8 is impressed through rectifier 251c upon relay coil 252 causing a voltage drop across relay coil 252. Since the error signal is negative with respect to ground potential the diode 251c conducts impressing a voltage drop across coil 252 which is sufficient to maintain the movable arms 252a' through 252d' of contact pairs 252a through 252d respectively in the downward vertical position by means of mechanical linkage 260. Thus, in the downward position the turret error signal from the phase demodulator which is represented by block 251b is amplified through the horizontal driver 25a and drives turret torquer 73' which is equivalent to the D.C. torquer 73 shown in FIGURES 2 and 3. At this instant, the scriber command signal is disconnected from the x' amplifier 259 due to the position of movable arm 252d'. The scriber solenoid represented by block 96' which is the schematic representation of the solenoid 96 shown in FIGURES 2 and 3 is likewise disconnected. The turret solenoid which is represented schematically by block 78' is connected to the 28 volt source due to the downward positioning of movable arm 252a' causing the detent 81 (see FIGURE 2) to be disengaged from the adjacent notch 79 during the slide rotating operation. The turret torquer 73' which is connected to "x" amplifier 259 due to the positioning of movable arm 252c receives the output signal therefrom and consequently positions the turret accordingly.

Upon the occurrence of zero error signal which signified the fact that the turret 72 (see FIGURE 2) is appropriately aligned angularly, the voltage drop across relay coil 252 is insufficient to retain the movable arms 252a' through 252d' in the downward position. This impresses the input from the stylus command signal "x" 258 upon the "x" amplifier 259, the output of which is connected to the stylus torquer, which is represented schematically by block 47', in order to position scribing stylus 103 (see FIGURE 2) horizontal or "x" position. The phase demodulator 251b which is connected to the output of the synchro generator 230 (see FIGURE 25) is employed to transform the output of the synchro generator into a D.C. voltage so that the appropriate input may be impressed upon "x" amplifier 259.

The movable arm 252b' being in its upward vertical position energizes scriber solenoid 96' causing the scribing stylus 103 (see FIGURE 4) to make contact with the opaque slide 71 as previously described so as to permit scribing of the slide 71 while the slide is locked from rotation by means of detent 81. The movable arm 252a being in its upper vertical position disconnects the D.C. source from current solenoid 78' to insure that detent 81 remains in engagement with the notch 79 so that the angular movement of turret wheel 72 will not be permitted.

*Turret Positioning Means*

The electrical circuitry 260 employed in positioning the turret wheel 72 is shown in FIGURE 9. The selector circuitry 260 is comprised of a plurality of movable arms 261–266 which are operable by push-buttons (not shown) located on the data projector console for manually controlling the angular positioning of the turret wheel. Each movable arm 261–266 is connected by means of a common conductor 274 to a voltage source E+. The opposite ends of movable arms 261–266 are engageable with stationary terminals 261a through 266a depending upon which push-button is depressed at any given instant. Each stationary contact 261a through 266a is connected by conductor means to an associated terminal 261b through 266b for selective engagement with the rotary arm 267 of a stepping switch. The opposite end of stepping switch rotary arm 260a is connected by conductor 268 to movable arm 269 which is engageable with a stationary contact 270 connected by conductor 272 to relay winding 271, the opposite terminal of which is connected to ground potential 273. Although the turret selector circuitry 260 of FIGURE 9 shows only 6 movable arms 261–266 it should be understood that a greater number of movable arms operated by push-buttons may be employed in order to control the turret wheel to assume as many as 20 different angular positions, for example.

The operation of turret selector circuitry 260 is as follows:

The push-buttons (not shown) which control the associated movable arms 261–266 are operatively connected to a mechanical linkage represented schematically by dotted line 275 to prevent more than one push-button to be depressed at any given instant. Assuming that the initial condition of turret selector circuitry 260 is such that the first movable arm 261 is in the position shown by the solid line representation 261', the mechanical linkage 275 prevents the movable arms 262 through 266 from moving from the position shown in FIGURE 9 to the depressed position. At this instant the E+ voltage source is not connected to the relay coil 271 even though the movable arm of the stepping switch is in the position shown by the solid line 267. Assuming now that the pushbutton associated with movable arm 262 operates this arm to the dashed line position 262', the mechanical linkage 275 causes the movable arm of the first position to move from the position shown by solid line 261' to the position shown by dotted line 261. In this position a current path exists from the E+ voltage source through common line 274 movable arm 261, stationary contact 261a, stepping switch arm 260a, conductor 268,, movable arm 269, stationary contact 270, lead 272 through relay coil 271 to ground potential 273. The energization of relay coil 271 causes movable arm 260a and movable arm 269 to move respectively to the positions shown by dotted line 260a' and dotted line 269'. The purpose of movable arm 269 and associated contact 270 is to cause stepping switch 267 to step only one position at a time since the separation of movable arm 269 with stationary contact 270 causes deenergization of relay coil 271. After a predetermined time delay, movable arm 269' moves back to the position shown by solid line 269 causing reengagement with stationary contact 270. However, since the second push-button has been depressed, movable arm 262 is now in the position shown by dotted line 262' thus, disconnecting the E+ voltage source from relay coil 271. Thus, although the movable arm 269 has returned from the position shown by dotted line 269' to the solid line position, the stepping arm 267 which is now in the position shown by dotted line 267' is prevented from stepping any further in the clockwise direction. The stepping switch 260a is connected to the resistance delta circuit 260b (see also FIGURE 25) which in turn connects the appropriate voltage to amplifier 232 which impresses its output on D.C. torquer 73 in order to appropriately position turret wheel 72. The scriber solenoid 96 (see FIGURES 2 and 3) is not operable in this relay position which insures against an accidental scribing operation. The turret control circuitry is similar on projectors with color discs. However, it allows for only 8 positions and multiplexes the vertical or "y" amplifier function between scribing and color disc positioning in the same manner as described above with respect to the multiplexing of "x" or horizontal input and the turret positioning input signals.

The rotary arm 260a is coupled to rotary arm 260b of delta network 231 by mechanical linkage 260c. Arm 260b thereby rotates in unison with arm 260a so as to selectively engage the taps 261c–266c of multitap resistance 291. The resistance 291 is connected across the windings 292 and 293 of Y-windings 231 to regulate the total impedance thereof. Leads to 297 and 298 provide a current path from servo amplifier 232 input terminals to arm 260b, resistance 291, lead 299a and windings 293 and 294.

Rotatable winding 296 which is energized by A.C. source 296a generates a magnetic field which generates an E.M.F. in each winding 292–294. The magnitude of the E.M.F. is regulated by the resistance 291. The resultant E.M.F. is amplified by amplifier 232 to energize turret motor 73. In addition to being mechanically linked to the turret (see FIGURE 25) motor 73 is coupled to winding 296 by mechanical linkage 295 causing winding 296 to rotate in either the clockwise or counterclockwise direction to reduce the resultant E.M.F. developed by windings 292–294 to zero when turret 72 (see FIGURE 25) is in proper alignment.

Digital-to-Analog Circuit

Figure 11A:
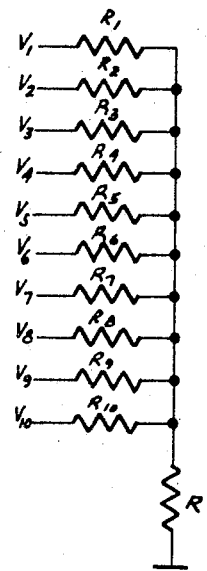
FIGURES 11a and 11b are two alternative preferred embodiments of the digital to analog convertor means of FIGURE 10 which may be employed in our novel data projection system.
Figure 11B:
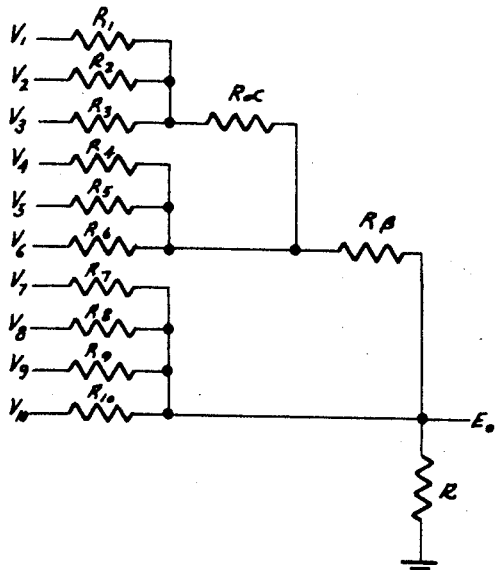

The digital to analog converter shown in FIGURES 10, 11a and 11b is employed to convert the digital output from the computer facility into proportional analog signals which are employed to position D.C. servos 36 and 47 shown in FIGURES 2 and 3 into the appropriate "y" and "x" coordinates respectively to which the scribing stylus 103 is to be moved. The digital information derived from the digiwriter of FIGURE 12 (which will be more fully described) is in the form of ten bit parallel binary words available at one millisecond data rate as will be more fully described.

FIGURE 10 illustrates the technique for converting digital information into an analog voltage. The circuit may be analyzed in the following manner. The current I flowing from the E reference terminal to ground potential 281 of the digital-to-analog circuit arrangement 280 is equal to: E reference $R_A + R_B$; where: $R_A$ = the resistance between the E reference terminal 282 and the output terminal 283 and $R_B$ = the resistance between the output terminal 283 and ground terminal 281. This current may be expressed as: IS E reference $$\frac{(G_A)(G_B)}{G_A G_B}$$

where $G_A$ and $G_B$ are conductances with $$G_A = \frac{1}{R_A}$$

and $$G_B = \frac{1}{R_B}$$

The output voltage $$E_o = I R_B \text{ where } R_B = \frac{1}{G_B}$$

If I from the above equation is substituted, it is found that: $E_o = E$ references $$\frac{(G_A)}{G_A + G_B}$$

It may now be observed that $$G_A + G_B = \frac{1}{R_B} + \frac{1}{R_0} + \frac{1}{R_1} + \frac{1}{R_2} + \cdots + \frac{1}{R_n}$$

or, in other words is equal to the total of the conductances (G) of all the resistances (R) in circuit 280 regardless of the binary bits being encoded.

The operation of the solid state switches $S_0$ through $S_n$ is such that a binary "one" input to a switch causes the output of the solid state switch to be = $E_{reference}$. The binary inputs are impressed upon the input leads carrying the designations $A_0$ through $A_{n-1}$ respectively. The absence of a binary "one" (i.e. a binary "zero") causes the output of the respective solid state switches $S_0$ through $S_{n-1}$ to be fixed at ground potential. The resistances $R_0$ through $R_{n-1}$ have resistance values which are proportional to the weight of the binary bit position which they represent and which switch they are associated with, thus producing an output which is an analog voltage proportion to the binary coded decimal digital input.

The solid state switches $S_0$ through $S_{n-1}$ are employed since the digital conversion takes place at a one millisecond rate and the settling time requirement is one one-hundredth of a millisecond. The switches $S_0$ through $S_{n-1}$ are designed to have the same impedance in the binary "one" or binary "zero" state. In the binary "one" state full reference voltage E reference is applied to $R_I$. In the binary "zero" state $R_I$ is connected to ground potential. These requirements are most stringent in the highest order binary bits where deviations from the ideal switch performance contribute the greatest error to the output. It has been found that the switch requirements are adequately met to the accuracy compatible with a 0.1% system by employing multi-transistor gate circuits.

Another problem which arises in the configuration of FIGURE 10 is shown in FIGURE 11a. Since the resistors $R_I$ through $R_{10}$ are "weighted" in inverse proportion to the bit weight, the ratio $$\frac{R_I}{R_{10}} = \frac{2^9}{1} = 512$$

This range of resistance values presents a severe switching problem, since the resistive load presented to the reference voltage $E_{ref}$ varies in accordance with the binary input impressed upon the terminals $A_0$ through $A_{n-1}$, shown in FIGURE 10. This problem is alleviated by using an equivalent resistive network such as that shown in FIGURE 11b which employs resistors $R_a$ and $R_b$ to attenuate the output thus alleviating the switching problems.

Data Projector Input Means

The digiwriter assembly 300 shown in FIGURE 12 is employed to provide the binary coded "x" and "y" coordinates for the data projector digital-to-analog converters for the purpose of driving the scribing stylus 103 (see FIGURES 2 and 3) under control of the D.C. torque motors previously described.

The digiwriter system 300 is comprised of a plotting board 301 having a planar surface on which a hand-held stylus or pen 302 is used. The operator conventionally traces or writes information so that his ciphering act can be duplicated and simultaneously displayed at a remote location with imperceptible time lag, performed by the data projector and digiwriter systems of FIGURES 1 and 12 respectively.

Figure 14:
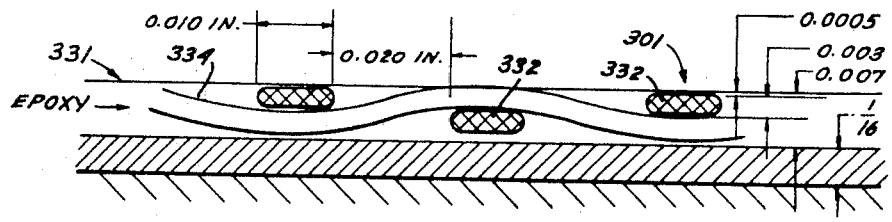
FIGURE 14 is a cross sectional view of the data plotting board taken along line 14–14' of FIGURE 12.

The "x"–"y" (i.e. horizontal-vertical) plotting board 301 is composed of an orthogonal wire mesh screen 330 (see FIGURES 13 and 14) embedded in a clear plastic sheet 331. The wire mesh screen consists of a plurality of equally spaced wires 332 which are positioned so as to be parallel to the side 333 of the board 331 and a second plurality of equally spaced wires 334 which are intermeshed with wires 332 being positioned at right angles to wires 332. Each wire 332 corresponds to an "x" coordinate and each wire 334 corresponds to a "y" coordinate which coordinates are measured along mutually perpendicular board edges. The wires 332 and 334 are electrically insulated from each other at all times. The board is formed of a plastic epoxy and the wires are woven in a standard basket weave pattern.

The technique employed in the digiwriter assembly 300 is that of electromagnetically detecting the position of a pulse passing through a specified "y" or "x" input wire by (1) that of detecting pulses from the writing board, (2) providing the writer with a record of his prior writing and (3) initiating projector stylus follow-up, which functions will be more fully described. The electromagnetic energy picked up by the stylus 302 is converted by the stylus transducer means (not shown) to produce a voltage representative of the electromagnetic radiation picked up by stylus 302. This is transferred by conductor 360a to a video amplifier 304 whose output 304a is connected to a two-input and gate 310. The output is also connected to the "y" axis circuitry by lead 304b. The "y" axis digiwriter circuitry (not shown) is identical to the portion 350 of the digiwriter system 300 shown in FIGURE 12 employed for the purpose of generating the binary coded "x" coordinate as will be more fully described.

The clock pulse source 305 of the digiwriter system 300 provides a clock rate for controlling the system timing. The clock pulse rate is, in the preferred embodiment, derived from an assumed writing speed of 9 inches per second and a division of the plotting board having dimensions of 30 by 30 inches into a 1,000 by 1,000 wire mesh such as that shown in FIGURE 13. Employing these figures, the fastest stylus rate in crossing the plotting board grid is 300 wires per second or $\frac{1}{300}$ of one second per wire.

In order to intercept a stylus motion equivalent to one wire spacing in a manner to be more fully described the total number of wires (1000 in one coordinate) is scanned through in one 300th of a second. This yields a pulse repetition rate of 300,000 pulses per second. To facilitate "x" and "y" coordinate differentiation the respective clock pulses will be interlaced, which amounts to doubling the clock rate to 600,000 pulses per second. The output of clock pulse source 305 is impressed upon an alternator switch circuit 306 which consists of one flip-flop circuit having two AND gates connected thereto to provide the necessary "x"–"y" pulse separation.

The "x" output of alternate pulse selector 306 is impressed upon switching matrix 307 and 10 bit binary counter 308 in concurrent fashion. The ten bit binary counter 308, upon receipt of pulses from the pulse selector 306, generates a ten binary bit word which is decoded by the "x" axis switching matrix 307 which decodes the 10 binary bit word generated by counter 308 so that only one of the 1,000 outputs 307a receives a pulse which pulse is transmitted to the appropriate wire 313a associated therewith, and which is connected to the appropriate wire 332 of the writing board 301. (Note especially FIGURES 12 and 14.) The "x" output from alternate pulse selector 306 is impressed upon the "x" axis switching matrix 307 so that the output leads 307a of the switching matrix 307 receive a pulse only upon the simultaneous presence of a count in the 10 bit binary counter and the presence of an "x" pulse from the pulse selector. This prevents the simultaneous presence of a pulse in one of the "x" wires 332 and one of the "y" wires 334. A matrix circuit of this type is described on pages 56 to 60 of the book, "Digital Computer Components and Circuits" by R. K. Richards, published 1957 by Van Nostrand. The pulse generated in the appropriate "x" wire 332 of the plotting board is inductively coupled to the stylus 302 which impresses this pulse after amplification in 304 upon the AND gate 310 simultaneously with an output pulse from alternate pulse selector 306. The AND gate 310 has two common output connections comprising a first output terminal 310a which is impressed upon a binary counter 309 for the purpose of inhibiting the count while a second output terminal 310b is coupled to signal read gates 311 for the purpose of coupling the binary count in "x" axis from binary counter 309 to the storage buffer 312. The binary bit output which is present on output terminals 312a of storage buffer 312 is then coupled to the digital-to-analog converter of FIGURE 10 the output of which is employed to energize the horizontal direct drive assembly D.C. torquer 47 as shown in FIGURES 2 and 3, as was previously described.

The writing board wires 332 and 334 are connected at one end to the horizontal or "x" input leads and at the other end to the vertical or "y" input leads 313a and 313b respectively. The other end of each wire terminal is in a loading resistor having its opposite end connected to ground potential. Each wire is pulsed sequentially by the pulse switching matrix of its associated "x" and "y" axis switching matrix respectively. The values of loading resistances (not shown) are chosen to prevent reflection of the pulses impressed therethrough.

The pulse impressed through each given wire generates the magnetic field surrounding the wire which field builds up and collapses in proportion to the current introduced therethrough. The plastic body 331 of the writing board has a high permeability due to the addition of powdered ferrous compounds which are admixed with the writing board epoxy base. The introduction of the ferrous compound produces a shaping of the magnetic induction field to project it above the writing surface so that the radius of the magnetic field is small above the board 331 and large within the plastic body, so that practically all the E.M.F. drop around the magnetic line of force occurs immediately above the writing board. The wires 332 and 334 have high electrical conductivity and low permeability so that they do not interfere with the magnetic field of intersecting wires. Also, since the "x" and "y" wires are at right angles to each other there is no interaction between the perpendicularly aligned magnetic fields.

A coordinate grid may be engraved on the plastic writing board surface which can be seen through a translucent or transparent paper. The etched board may then be edge lighted for operation in low ambient light levels.

The detection of the pulse generated by the matrix grid wires 332 and 334 is accomplished by mounting two small coils 360 and 361 (see FIGURE 26) placed at right angles to each other in the stylus 302. The coils are connected so that they sum the E.M.F. generated by the effective component of a varying magnetic field through one or the other or both pick-up coils. By arranging the coils 360 and 361 in a quadrature fashion this makes the coils insensitive to the direction of the magnetic field so that the angular positioning of the stylus 302 about its own longitudinal axis has no effect whatsoever upon the ability of the stylus 302 to pick up the appropriate pulse.

As the coils are placed in the proximity of the intersection of two grid wires on the writing board an E.M.F. is generated in the coils whenever a pulse passes through a particular wire. Two pulses are sensed, one denoting the "x" coordinate and one the "y" coordinate. The pulses are spaced at least one clock pulse apart in time at the minimum and 2,000 clock pulses apart at the maximum.

The writing stylus 302, of FIGURE 12 is shown in a phantom view of FIGURE 26, which stylus includes an outer cylindrical holder having an opening 362a at its lower end. A second cylindrical member 363 is positioned within cylinder 362 so that its lower edge 366 extends through the hole 362a of cylindrical member 362. Cylindrical member 363 is biased within cylindrical member 362 by spring means 368 which urges inner cylindrical member 363 vertically downward with respect to cylindrical member 362. A microswitch 367 is positioned between the inner surface 369 of cylindrical member 362 and the outer surface 370 of cylindrical member 363. The inner cylindrical member 363 has positioned therein a reservoir 364 for receiving writing fluid which reservoir is connected to the point 366 of the inner cylinder by means of tube 365 so as to supply writing fluid thereto. Positioned immediately above point 366 are two coils 360 and 361 which are arranged in quadrature so as to generate an E.M.F. due to the varying magnetic field which is generated E.M.F. insensitive to the angular alignment of the writing stylus 302 with respect to its own longitudinal axis 371 shown in FIGURE 26. The outermost terminals of the coils 360 and 361 are connected by the leads 360a and 361a respectively, to the video amplifier 304 shown in FIGURE 12. The leads 372 and 373 leading from microswitch 367 are connected to energizing means (not shown) for the purpose of initiating the projectograph operation and simultaneously lighting a pilot light (not shown) on the digiwriter board 301 shown in FIGURE 12. The employment of the pilot lamp is advantageous since it indicates the commencement of the writing action and further acts as a loose measure of minimum writing pressure.

Figure 13:
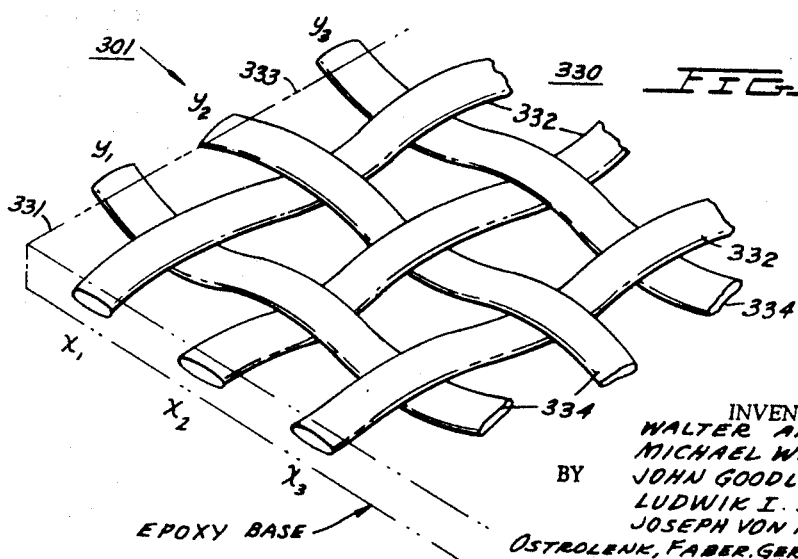
FIGURE 13 is a perspective view of the plotting board of the data plotting assembly shown in FIGURE 12.

The operation of the stylus 302 is as follows: Upon the engagement of point 306 with the writing surface inner cylindrical member 363 is moved upwardly relative to outer cylindrical member 362 against the force of spring member 368 so as to cause closing of the contacts (not shown) of microswitch 367 which initiates the writing operation. The magnetic fields set up by the matrix wires 332 and 334 as shown in FIGURE 13 are picked up by coils 360 and 361 which generate an electromotive force (E.M.F.) and connects this force to video amplifier 304 by means of leads 360a and 361a of FIGURE 26.

The operation of the "x" of horizontal axis pulsing means in conjunction with the writing stylus is as follows:

Clock pulse source 305 produces a 600 kilocycle clock rate wherein each pulse has a length of $0.8 \times 10^{-6}$ seconds. In the present embodiment a rise time of 10 percent of pulse width was designed into the clock pulse source which yielded a video band with in the order of 4 megacycles. A 600 kilocycle clock pulse rate made available at the clock pulse source 305 output terminal 305a is impressed upon the alternate pulse selector 306 which sequences the pulse train impressed upon its input so that the first pulse is impressed upon the "x" output and the second pulse is impressed upon the "y" output. The "x" pulse output 306a is impressed upon the first stage of a 10 bit binary counter and concurrently therewith upon the "x" axis switching matrix 307. The outputs from the 10 bit binary counter are employed as input signals to the matrix 307 so that only one of the 1,000 output wires 307a will be sensed at any instant. The output wires 307a are connected to associated input wires 313a which are in turn connected to the "x" matrix wires 332 (see FIGURE 13) of the plotting board 301. The stylus 302 is generating trace T which generates an electromotive force in coils 360 and 361 due to the H field generated by the "x" winding 332', for example, since in the preferred embodiment the plotting board 302 measures 30 inches by 30 inches and since the "x" wires are 1,000 in number this allows a resolution of 0.030 inch. Because of the intensity of the magnetic field which varies as the reciprocal as the square of the distance of the wire, the field intensity falls off rapidly on either side of the grid wire, as, for example, the grid wire 332' of FIGURE 12. The falling off of the magnetic field is further intensified by the field shape itself, thus the perpendicularly aligned windings 360 and 361 (see FIGURE 26) will pick up the magnetic field of the "x" wire closest in proximity to it. At the same instant the output 306a of the alternate pulse selector 306 is likewise impressed upon the "x" axis binary counter 309 which generates a binary coded count which count begins at time zero as the "x" wires 332 are sensed on the left hand edge of plotting board 301 and increases by one as the sensing of the "x" matrix wires moves to the right hand edge of plotting board 301. It should be understood that at the end of the count (which is a decimal count of 1,000) the "x" axis binary counter automatically resets to zero in order to begin a new count. Thus it can be seen that the timing of the pulses derived from alternate pulse selector 306, which elapsed time count is stored in "x" axis binary counter 309, is directly related to the "x" position of the plotting board 301. The output pulse generated in pickup coils 360 and 361 of the stylus 302 (see FIGURE 26) is transferred by means of conductor 360a to video amplifier 304. Video amplifier 304 having a gain of approximately 20, greatly reduces spurious pick up in the connecting cable between the stylus and the input of the amplifier 304. The amplified output signal is impressed upon lead 304a which transfers the pulse to input AND gate 310. The output pulse from the video amplifier 304 occurs coincidentally with the "x" pulse of the "x" output lead 306a of the alternate pulse selector 306 permitting the pulse to pass through AND gate 310. The pulse from AND gate 310 is transferred by means of lead 310a to "x" axis binary counter 309 for the purpose of momentarily stopping the counting operation of counter 309. The pulse from gate 310 is also transferred by means of lead 310b to signal read gates 311 which enable the outputs from all stages of the "x" axis binary counter 309 to be transferred to storage buffer 312 which subsequently passes the binary coded decimal word to the digital-to-analog converter of the data projector 10 (see FIGURE 1) by means of buffer output means 312a. Since a 10 bit binary counter is employed, a count of 1024 may be developed. However, only 1000 wires are used in either the "x" or "y" coordinates permitting the remaining counts to be used for reset purposes, etc.

As previously described, in order to develop a binary coded decimal representation for the "y" coordinate, a portion 350 of the writing system embraced by the dotted lines must be duplicated and connected to the stylus and alternate pulse selector in the manner shown by the output leads 304b and 306b, respectively. The pulse occurring in the "x" matrix wire, such as the "x" matrix wire 332' of FIGURE 12, will not be mistaken for a "y" pulse generated by a "y" matrix wire since there must be coincidence with the E.M.F. developed by the stylus 302 and the "x" output from the alternate pulse selector 306 which is impressed upon output terminal 306a. Also the stylus transducer which is comprised of "x" coils 360 and 361 shown in FIGURE 26 is designed to be sensitive to input pulse energy over only a very small area of the board, on the order of one-half of a wire space and resolution is good to one wire space.

The stylus 302 in addition to generating the binary coded representations of both the "x" and "y" coordinates also generates trace T either upon the surface of the plotting board 301 or upon a thin paper overlay which may be placed upon the plotting board. In order to permit writing directly upon the surface of the plotting board 301, the writing fluid chosen may be of the non-smearing-solvent-erase type which may be easily imprinted on or erased from the plotting board. A coordinate grid can be engraved on the plastic writing board top which can be seen through a translucent or transparent paper in order to facilitate the plotting speed of the operator upon the plotting board 301.

Multiple Projector System

FIGURE 7 is a systems diagram 410 wherein a bank of data projectors 10 are utilized, each projector casting a projection of the trace being generated on screen 411. The projectors 10 are shown in FIGURE 7 designated by the letters A through T. A central control means 412 is provided having a plurality of pushbuttons 413 for advancing (i.e. rotating) the opaque annular slide members of each projector 10A through 10T. A rotary control 414 is provided for selecting any one of the projectors 10A through 10T for the purposes of studying the trace or plot of the selected projector.

A bank of analog-to-digital converters 280 are provided for the purpose of converting the digital information from the computer source 300 (also see FIGURE 12) wherein the digital information is impressed upon the analog-to-digital converters 280 at input terminals 415. It should be understood that each analog to digital converter has 10 input terminals for receiving the binary coded decimal representations from the digiwriter mechanism 300 of FIGURE 12. The analog output from converters 280 are transferred by means of leads 416 to the appropriate "x" and "y" servo amplifiers 47 and 36 respectively which are employed to drive the stylus to their associated projectors 10.

The screen 411 is a rear projection screen which avoids the ordinary problem of obscuration to certain members of the audience sitting behind the bank of projectors 10. It should be understood, however, that any projection screen arrangement may be employed since the arrangement used lends no novelty to the instant invention. The screen is made of a special vinyl material which is frosted to a matte surface on one side which gives a maximum diffusion to the image without an undue light loss due to scattering. The screen is stretched taut by lacings attached to the grommets at the screen edges (not shown). The screen frame is made of aluminum thus combining rigidity with light weight. Since the rear projection system is employed, the left to right orientation of the scriber will be kept unreverted whereas the top bottom orientation of the scriber will be inverted as in the ordinary opaque screen projection.

The light beams 415 emanating from projectors 10A through 10T converge toward a central portion of the screen which creates a certain amount of distortion as can be seen in FIGURE 20.

Projector Lens Assemblies

The distortion creates a trapezoidal effect due to the oblique projection which produces unequal magnification and unequal sharpness of focus at the center and at the corner of a projected image. In FIGURE 20 a projector which is shown schematically as being comprised of merely the projector lens 420 is tilted at an angle $\theta$ to the screen such that the original image 421 appears as a trapezoidal image 422 upon the screen 411. As can be seen from the geometric figure 422 it is apparent that the magnification at the bottom of the figure corresponding to the side $D_1C_1$ will be greater than the magnification of the top side $B_1A_1$ by a factor equal to the ratio $d_2$ divided by $d_1$ ($d_2/d_1$). A good approximation for the trapezoidal distortion ratio is derived as follows:

$$\frac{D_1C_1}{B_1A_1} = \frac{d_2}{d_1} = \frac{K \sec (\alpha+\theta)}{K \sec (\alpha-\theta)} = \frac{\cos (\alpha-\theta)}{\cos (\alpha+\theta)}$$

where the total angular field and $\theta$=the angular tilt of the projector. To take a specific example, assume:

$$\alpha = \arctan \frac{0.5}{2} = 0.25 = 14° \text{ and } \theta = 5°,$$

the trapezoidal distortion ratio then becomes:

$$\frac{d_2}{d_1} = \frac{\cos 9°}{\cos 19°} = \frac{.09877}{.09455} = 1.045.$$

This means that the side $D_1C_1$ will be about 4½% larger than the side $A_1B_1$. The trapezoidal distortion may be eliminated by employing a variable gain potentiometer control in the torque motors 47 and 36 of any given projector which potentiometers will be a linear function to compensate for the trapezoidal distortion ratio which is likewise a linear function of the tilt angle so as to eliminate the appearance of distortion whatsoever. The same scheme is employed for correcting trapezoidal effects when the lens is displaced in the "x"—"y" plane so that the same circuitry is used for both corrective actions wherein each has as its input the displacement distances from the "x"—"z" and "x"—"y" respectively.

Since given lens assemblies presently in use have focal lengths which vary by as much as ±2% causing the lenses of a bank of projectors such as those shown in FIGURE 7 to be unmatched, this may be corrected electronically by varying the "x" and "y" constants via the scriber follow-up potentiometers, in order to equalize all final image sizes. It has been discovered that the employment of lenses of the Biotar type having highly corrected systems of F2.8 aperture or better and possessing a minimum of radio distortion consistent with the angular field coverage required were found to have less than ½ of 1% radial distortion which is well within the desired limits. The light source employed achieved approximately 1000 lumens output toward the screen which assures adequate image brightness for all conceivable purposes even with the use of the filters 83 shown in FIGURE 2.

A typical data projector problem is illustrated in FIGURE 21 which shows the screen 301 having a four-line trace consisting of the straight lines A, B, C, and D having arrows showing the direction of development of the traces which are portrayed on the screen 411. The following table is the analysis of the time cycle of the stylus through each of the excursions A through D:

| Command Operation | Track | Detail Time | Total Time, secs. max. |
|---|---|---|---|
| 1 | A | Digital to analog conversion 0.001 sec. Stylus (command) 0.020 sec. Servo response and time to complete the 1.414″ travel 0.350 sec. | 0.371 |
| 2 | B | D-A conversion 0.001 sec. Stylus down 0.020 sec. Servo response 0.090 sec. | 0.111 |
| 3 | C | D-A conversion 0.001 sec. Stylus up 0.020 sec. Servo response 0.175 sec. | 0.196 |
| 4 | D | D-A conversion 0.001 sec. Stylus down 0.020 sec. Servo response 0.135 sec. | 0.156 |

Total time for entire problem: 0.834 second maximum.

It can be seen that with my novel direct drive arrangement that swift response capabilities are derived from the system regardless of the complexity of the plotting problem involved.

Projector Coating Composition

The slide coating composition of the annular slide 71 as shown in FIGURE 27, which is a cross-section of the opaque slide, consists of a glass layer 403 having a primary coating of lead, indium or equivalent impressed thereon. The primary coating 402 has the characteristics of low melting point, spreading quite uniformly during the depositing operation and a low degree of ionization. The thickness of the primary coating 402 is on the order of wave lengths and is approximately 10% of the total thickness T of the entire coating arrangement. The coating primary 402 of the desired thickness has a relatively high percentage of light transmission. The secondary coating 401 which may be a coating of aluminum or equivalent is employed to provide the necessary feature of opaqueness due to the relatively high light transmission characteristic of the primary coating 402. It was found that use of the secondary coating alone required substantially more scribing power than the primary-secondary coatings of the instant invention. It has been found that metals such as aluminum, molybdenum, and silver, for example, may be substituted in place of aluminum as long as the metals used have a high degree of purity. It has been found that during the scribing operation the undercoating 402 acts as a lubricant beneath the secondary coating 401 so that the removal of scribing operation of these coatings is substantially smoother than the scribing of the secondary coating in the absence of the primary coating as described above. A single aluminum layer of the secondary coating has the disadvantage of producing a jagged line during the scribing operation giving a "snow plow" effect whereas the employment of the primary coating beneath the secondary coating obviates these disadvantages. The thickness of the secondary coating is of the order of 80% of the total thickness T of the coating arrangement impressed upon the substrate 403.

A third coating or layer 400 may consist of a magnesium fluoride or equivalent composition. This layer has the characteristic of being extremely thin and having a high degree of toughness. The toughness however, is insufficient to impair the scribing operation. This coating acts as a protective means to prevent chemical reactions to take place with the primary and secondary layers. The third coating has a thickness of the order of 5% of the total thickness T of the entire coating arrangement. Although the third layer provides protection against any chemical reactions, it has been found that desirable results have been procured in the absence of the third coating and the choice of the presence or absence of this layer depends strictly upon the needs of the user. It has been found that this process of slide coating provides a better composition; line resolution, less stylus wear; complete freedom from skipping and line uniformity when scribed.

Although we have described preferred embodiments of our novel invention, many variations and modifications will now be obvious to those skilled in the art, and we prefer therefore to be limited not by the specific disclosure herein but only by the appended claims.

We claim:

1. In a data plotting projector a scribing stylus, stylus positioning means, carriage means for resiliently suspending said stylus to permit movement of said stylus in first and second mutually perpendicular directions, said carriage means including first means operatively connected to said stylus movable in said first direction, second means operatively connected to said stylus movable in said second direction, said first and second means being adapted to be prevented from movement in the second and first directions respectively, said stylus positioning means being adapted to move said stylus from a neutral position upon energization thereof, said carriage means being adapted to urge said stylus towards said neutral position, said first and second means comprising first and second resilient members, respectively.

2. In a data plotting projector a scribing stylus, stylus positioning means, carriage means for resiliently suspending said stylus to permit movement of said stylus in first and second mutually perpendicular directions, said carriage means including first means operatively connected to said stylus movable in said first direction, second means operatively connected to said stylus movable in said second direction, said first and second means being adapted to be prevented from movement in the second and first directions respectively, said stylus positioning means being adapted to move said stylus from a neutral position upon energization thereof, said carriage means being adapted to urge said stylus towards said neutral position, said first and second means comprising first and second resilient members, respectively.

3. In a data plotting projector, a projector housing, a transparent stylus mounting means movable in first and second mutually perpendicular directions positioned in said housing; a first plurality of resilient members coupled to said slide means; a second group of resilient members coupling said first group of resilient members to said housing.

4. In a data plotting projector, a projector housing, a transparent stylus mounting means movable in first and second mutually perpendicular directions positioned in said housing; a first plurality of resilient members coupled to said slide means; a second group of resilient members coupling said first group of resilient members to said housing, said first and second groups of resilient members being adapted to be deflected in said first and second directions respectively.

5. In a data plotting projector, a projector housing, a transparent stylus mounting means movable in first and second mutually perpendicular directions positioned in said housing; a first plurality of resilient members coupled to said stylus mounting means; a second group of resilient members coupling said first group of resilient members to said housing, said first and second groups of resilient members being adapted to be deflected in said first and second directions respectively, said first and second groups being adapted to be inflexible in said second and first directions, respectively.

6. In a data plotting projector, a projector housing, a transparent stylus mounting means movable in first and second mutually perpendicular directions positioned in said housing; a first plurality of resilient members coupled to said stylus mounting means; a second group of resilient members coupling said first group of resilient members to said housing, said first and second groups of resilient members being adapted to be deflected in said first and second directions respectively, said first and second groups being adapted to be inflexible in said second and first directions, respectively, substantially all of the deflection experienced by said second group of resilient members being imparted to said slide means due to the rigidity of said first group of resilient members existing in said second direction.

7. In a data plotting projector, a projector housing, a transparent stylus mounting means movable in first and second mutually perpendicular directions positioned in said housing; a first plurality of resilient members coupled to said stylus mounting means; a second group of resilient members coupling said first group of resilient members to said housing, said first and second groups of resilient members being adapted to movably position said slide means to prevent said slide means from experiencing any rotational motion.

8. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding plate and their second ends secured to said outer frame, said first and second groups of resilient members being adapted to permit said stylus holding member to experience movement in said first and second directions while limiting movement of said outer frame to said first direction.

9. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction.

10. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said second group of resilient members being flexible in said second direction and rigid in said first direction.

11. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus mounting plate by said second group of resilient members.

12. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus holding member by said second group of resilient members, and being further adapted to prevent the deflection experienced by said stylus holding member to be imparted to said outer frame.

13. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus holding member by said second group of resilient members, and being further adapted to prevent the deflection experienced by said stylus holding member to be imparted to said outer frame, said resilient members of said first group being substantially U-shaped.

14. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus holding member by said second group of resilient members, and being further adapted to prevent the deflection experienced by said stylus holding member to be imparted to said outer frame, said resilient members of said second group being substantially U-shaped.

15. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus holding member by said second group of resilient members, and being further adapted to prevent the deflection experienced by said stylus holding member to be imparted to said outer frame, said resilient members of said first group being substantially U-shaped, said U-shaped members of said first group being secured to said housing to form a first cantilever suspension.

16. In a data plotting projector, a projector housing, a stylus holding member movable in first and second mutually perpendicular directions positioned in said housing; a scribing stylus secured to said holding member, a first group of resilient members each having their first ends secured to said housing, an outer frame, the second ends of said resilient members secured to said outer frame, guide means provided in said housing and surrounding said outer frame for limiting movement of said outer frame to said first direction, a second group of resilient members each having their first ends secured to said stylus holding member and their second ends secured to said outer frame, said first and second groups of resilient members being adapted to permit said stylus holding member to experience movement in said first and second directions while limiting movement of said outer frame to said first direction, said first group of resilient members being flexible in said first direction and rigid in said second direction; said second group of resilient members being flexible in said second direction and rigid in said first direction, said suspension being adapted to cause substantially all of the deflection experienced by said outer frame being imparted to said stylus holding member by said second group of resilient members, and being further adapted to prevent the deflection experienced by said stylus holding member to be imparted to said outer frame, said resilient members of said second group being substantially U-shaped, said U-shaped members of said second group being secured to said outer frame to form a second cantilever suspension.

17. A data plotting projector comprising a scribing stylus and a stylus holding plate, mounted for movement in first and second mutually perpendicular directions positioned within said housing, a first group of U-shaped spring members, an outer frame parallel to said stylus mounting plate, guide means in said housing for permitting movement of said outer frame in said first direction while preventing movement in said second direction, the first arm of each of said U-shaped spring members being secured to said outer frame, the second arm of each of said U-shaped members being secured to said stylus holding plate, said resilient members being flexible in a first direction and rigid in a second direction, said resilient members being adapted to permit relative movement between said stylus holding plate and said outer frame in said first direction.

18. A data plotting projector comprising a scribing stylus and a stylus holding plate, mounted for movement in first and second mutually perpendicular directions positioned within said housing, a first group of U-shaped spring members, an outer frame parallel to said stylus mounting plate, guide means in said housing for permitting movement of said outer frame in said first direction while preventing movement in said second direction, the first arm of each of said U-shaped spring members being secured to said outer frame, the second arm of each of said U-shaped members being secured to said stylus holding plate, said resilient members being flexible in a first direction and rigid in a second direction, said resilient members being adapted to permit relative movement between said stylus holding plate and said outer frame in said first direction, a second group of U-shaped spring members a first end of each second group U-shaped member being secured to said housing, a second end of each second group U-shaped members being secured to said stylus holding plate, said second group of spring members being flexible in a first direction and rigid in a second direction and being adapted to permit relative movement between said outer frame and said housing.

19. A data plotting projector comprising a scribing stylus and a stylus holding plate, mounted for movement in first and second mutually perpendicular directions positioned within said housing, a first group of U-shaped spring members, an outer frame parallel to said stylus mounting plate, guide means in said housing for permitting movement of said outer frame in said first direction while preventing movement in said second direction, the first arm of each of said U-shaped spring members being secured to said outer frame, the second arm of each of said U-shaped members being secured to said stylus holding plate, said resilient members being flexible in a first direction and rigid in a second direction, said resilient members being adapted to permit relative movement between said stylus holding plate and said outer frame in said first direction, said second group of resilient members being adapted to absorb all of the movement of said stylus holding plate in said first direction and to remain rigid upon movement of said stylus holding plate in said second direction.

20. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a servo means operative responsive to said input signal, said servo means being adapted to rotate wherein the amount of rotation is proportional to the magnitude of said input signal and the direction of rotation is proportional to the polarity of said input signal; direct drive tape means connected between said servo means and said stylus; said tape drive means being adapted to convert said rotational motion into translational motion for moving said stylus.

21. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a servo means operative responsive to said input signal, said servo means being adapted to rotate wherein the amount of rotation is proportional to the magnitude of said input signal and the direction of rotation is proportional to the polarity of said input signal; direct drive tape means connected between said servo means and said stylus; said tape drive means being adapted to convert said rotational motion into translational motion for moving said stylus, said direct drive means including a flexible tape.

22. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a servo means operative responsive to said input signal, said servo means being adapted to rotate wherein the amount of rotation is proportional to the magnitude of said input signal and the direction of rotation is proportional to the polarity of said input signal; direct drive tape means connected between said servo means and said stylus; said tape drive means being adapted to convert said rotational motion into translational motion for moving said stylus, said direct drive means including a flexible tape, a second flexible tape, said first tape being adapted to move said stylus in a first direction; first means positioned between said second flexible tape and said scribing stylus for keeping said second flexible tape taut when said stylus is moved by said first flexible tape.

23. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a servo means operative responsive to said input signal, said servo means being adapted to rotate wherein the amount of rotation is proportional to the magnitude of said input signal and the direction of rotation is proportional to the polarity of said input signal; direct drive tape means connected between said servo means and said stylus; said tape drive means being adapted to convert said rotational motion into translational motion for moving said stylus, said direct drive means including a first flexible tape and a second flexible tape, said first tape being adapted to move said stylus in a first direction; first means positioned between said second flexible tape and said scribing stylus for keeping said second flexible tape taut when said stylus is moved by said first flexible tape; said second flexible tape being adapted to move said scribing stylus in a second direction opposite said first direction; said first means being further adapted to keep said first flexible tape taut when said scribing stylus is being moved by said first flexible tape.

24. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction.

25. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction.

26. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction, said frame assembly including an elongated member having a first end secured to said frame assembly, and a second end opposite said first end operatively associated with said second flexible tape.

27. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction, said frame assembly including an elongated member having a first end secured to said frame assembly, and a second end opposite said first end operatively associated with said second flexible tape, said pulley being adapted to reel in said first flexible tape when said scribing stylus is being moved in said first direction and being adapted to reel in said second flexible tape when said scribing stylus is being moved in said second direction.

28. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction, said frame assembly including an elongated member having a first end secured to said frame assembly, and a second end opposite said first end operatively associated with said second flexible tape, said pulley being adapted to reel in said first flexible tape when said scribing stylus is being moved in said first direction and being adapted to reel in said second flexible tape when said scribing stylus is being moved in said second direction, said elongated member being adapted to keep said second flexible tape taut when said scribing stylus is moving in said first direction and to keep said first flexible tape taut when said scribing stylus is moving in said second direction.

29. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction, said frame assembly including an elongated member having a first end secured to said frame assembly, and a second end opposite said first end operatively associated with said second flexible tape, said pulley being adapted to reel in said first flexible tape when said scribing stylus is being moved in said first direction and being adapted to reel in said second flexible tape when said scribing stylus is being moved in said second direction, said elongated member being adapted to keep said second flexible tape taut when said scribing stylus is moving in said first direction and to keep said first flexible tape taut when said scribing stylus is moving in said second direction, said pulley means having a slot, said first and second flexible tapes each having an end seated in said slot, an anchor member engageable with said slot for securing said tapes to said pulley.

30. A data projector comprising slide means having an opaque coating, a resiliently mounted frame assembly positioned adjacent said opaque coating, a scribing stylus secured to said frame assembly for etching said slide means, servo means having an armature and a drive shaft connected thereto, a pulley mounted at one end of said shaft, a flexible tape connected between said pulley and said frame assembly for moving said scribing stylus in a first direction, a second flexible tape connected between said pulley means and said frame assembly for moving said scribing stylus in a second direction opposite said first direction, said frame assembly including an elongated member having a first end secured to said frame assembly, and a second end opposite said first end operatively associated with said second flexible tape, said pulley being adapted to reel in said first flexible tape when said scribing stylus is being moved in said first direction and being adapted to reel in said second flexible tape when said scribing stylus is being moved in said second direction, said elongated member being adapted to keep said second flexible tape taut when said scribing stylus is moving in said first direction and to keep said first flexible tape taut when said scribing stylus is moving in said second direction, a substantially L-shaped member having an adjusting means positioned between said elongated member and said second flexible tape for maintaining said flexible tapes taut at all times, said direct drive assembly being adapted to eliminate backlash and friction between said servo means and said scribing stylus frame assembly.

31. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportional to the magnitude of said input signal and the direction of rotation is proportional to the polarity of said input signal; first and second direct drive tape means connected between said servo means and said stylus, each of said tape drive means being adapted to convert said rotational motion into translational motion for moving said stylus.

32. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportional to the magnitude of said input signal and the direction of rotation is proportional to the polarity of said input signal; first and second direct drive tape means connected between said servo means and said stylus, each of said tape drive means being adapted to convert said rotational motion into translational motion for moving said stylus, said direct drive means including a flexible tape.

33. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportional to the magnitude of said input signal and the direction of rotation is proportional to the polarity of said input signal; first and second direct drive tape means connected between said servo means and said stylus, each of said tape drive means being adapted to convert said rotational motion into translational motion for moving said stylus, said direct drive means including a flexible tape, first and second flexible tapes, said first tape being adapted to move said stylus in a first direction; first means positioned between said second flexible tape and said scribing stylus for keeping said second flexible tape taut when said stylus is moved by said first flexible tape.

34. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportional to the magnitude of said input signal and the direction of rotation is proportional to the polarity of said input signal; first and second direct drive tape means connected between said servo means and said stylus, said first drive means being adapted to convert said rotational motion into translational motion for moving said stylus; said direct drive means including a flexible tape; first and second flexible tapes, the first tape being adapted to move said stylus in a first direction; first means positioned between said second flexible tape and said scribing stylus for keeping said second flexible tape taut when said stylus is moved by said flexible tape; said second direct drive means including third and fourth flexible tapes, said third tape being adapted to move said stylus in a second direction perpendicular to said first direction; second means positioned between said fourth flexible tape and said scribing stylus for keeping said third flexible tape taut when said stylus is moved by said third flexible tape.

35. A data projector comprising a slide having on opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportionaal to the magnitude of said input signal and the direction of rotation is proportional to the polarity of said input signal; first and second direct drive tape means connected between said servo means and said stylus, said first drive means being adapted to convert said rotational motion into translational motion for moving said stylus; said direct drive means including a flexible tape; first and second flexible tapes, the first tape being adapted to move said stylus in a first direction; first means positioned between said second flexible tape and said scribing stylus for keeping said second flexible tape taut when said stylus is moved by said first flexible tape; said second direct drive means including third and fourth flexible tapes, said third tape being adapted to move said stylus in a second direction perpendicular to said first direction, second means positioned between said fourth flexible tape and said scribing stylus for keeping said third flexible tape taut when said stylus is moved by said third flexible tape, said second flexible tape being adapted to move said scribing stylus in a third direction opposite said first direction; said first means being adapted to keep said first flexible tape taut when said scribing stylus is being moved by said first flexible tape.

36. A data projector comprising a slide having an opaque coating means, a scribing stylus positioned adjacent said slide for etching said coating means, carriage means for resiliently mounting said stylus in said data projector, a drive assembly for moving said resiliently mounted stylus responsive to an input signal, said drive assembly including a first and second servo means operative responsive to said input signal, each of said servo means being adapted to rotate wherein the amount of rotation is proportional to the magnitude of said input signal and the direction of rotation is proportional to the polarity of said input signal; first and second direct drive tape means connected between said servo means and said stylus, said first drive means being adapted to convert said rotational motion into translational motion for moving said stylus; said direct drive means including a flexible tape; first and second flexible tapes, the first tape being adapted to move said stylus in a first direction; first means positioned between said second flexible tape and said scribing stylus for keeping said second flexible tape taut when said stylus is moved by said first flexible tape; said second direct drive means including third and fourth flexible tapes, said third tape being adapted to move said stylus in a second direction perpendicular to said first direction; second means positioned between said fourth flexible tape and said scribing stylus for keeping said third flexible tape taut when said stylus is moved by said third flexible tape; said fourth flexible tape being adapted to move said scribing stylus in a fourth direction opposite said third direction, said second means being adapted to keep said first third flexible tape taut when said scribing stylus is being moved by said fourth flexible tape.

37. A data projector comprising a slide having an opaque coating, resiliently mounted frame assembly, a scribing stylus secured to said frame assembly, said stylus being positioned adjacent said slide for etching said opaque coating, a drive assembly including a servo means for moving said resiliently mounted stylus responsive to an input signal, a rotatable drive shaft having a first end secured to said servo means, a pulley means secured to the second end of said shaft opposite said first end, a first flexible tape secured between said frame assembly and said pulley means for moving said scribing stylus in a first direction, a first sleeve having a first end secured to one side of said frame assembly, a sleeve retainer having an aperature for slideable engagement with the second end of said sleeve, said retainer being adapted to restrict movement of said sleeve in the direction of the sleeve longitudinal axis.

38. A data projector comprising a slide having an opaque coating, a resiliently mounted frame assembly, a scribing stylus secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slideable engagement with said second sleeve, said second sleeve and sleeve retainer members being adapted to aid said first sleeve and sleeve retainer members in restricting the motion of said first and second sleeves in the direction along the longitudinal axis of said first sleeve.

39. A data projector comprising a slide having an opaque coating, a resiliently mounted frame assembly, a scribing stylus secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slideable engagement with said second sleeve, said second sleeve and sleeve retainer members being adapted to aid said first sleeve and sleeve retainer members in restricting the motion of said first and second sleeves in the direction along the longitudinal axis of said first sleeve, said sleeves being substantially parallel to one another.

40. A data projector comprising a slide having an opaque coating, a resiliently mounted frame assembly, a scribing stylus secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slideable engagement with said second sleeve, said second sleeve and sleeve retainer members being adapted to aid said first sleeve and sleeve retainer members in restricting the motion of said first and second sleeves in the direction along the longitudinal axis of said first sleeve, a third sleeve retainer having an aperture for receiving said first sleeve member, said third sleeve retainer being fixedly secured to said first sleeve member and movable therewith, a second tape connected between said pulley means and said third sleeve for moving said frame assembly in a second direction opposite said first direction.

41. A data projector comprising a slide having an opaque coating, a resiliently mounted frame assembly, a scribing stylus resiliently secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slidable engagement with said second sleeve, said second sleeve and sleeve retainer members being adapted to aid said first sleeve and sleeve retainer members in restricting the motion of said first and second sleeves in the direction along the longitudinal axis of said first sleeve, a third sleeve retainer having an aperture for receiving said first sleeve member, said third sleeve retainer being fixedly secured to said first sleeve member and movable therewith, a second tape connected between said pulley means and said third sleeve for moving said frame assembly in a second direction opposite said first direction, said third retainer member being adapted to keep said second tape taut when said frame assembly is being moved by said first tape.

42. A data projector comprising a slide having an opaque coating, a resiliently mounted frame assembly, a scribing stylus resiliently secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slidable engagement with said second sleeve, said second sleeve and sleeve retainer members being adapted to aid said first sleeve and sleeve retainer members in restricting the motion of said first and second sleeves in the direction along the longitudinal axis of said first sleeve, a third sleeve retainer having an aperture for receiving said first sleeve member, said third sleeve retainer being fixedly secured to said first sleeve member and movable therewith, a second tape connected between said pulley means and said third sleeve for moving said frame assembly in a second direction opposite said first direction, said third retainer member being adapted to keep said second tape taut when said frame assembly is being moved by said first tape and being further adapted to keep said first tape taut while said frame assembly is being moved by said second tape.

43. A data projector comprising a slide having an opaque coating, a resiliently mounted frame assembly, a scribing stylus resiliently secured to said frame assembly, said stylus being positioned adjacent said slide for etching said opaque coating, a drive assembly including a servo means for moving said resiliently mounted stylus responsive to an input signal, a rotatable drive shaft having a first end secured to said shaft opposite said first end, a first flexible tape secured between said frame assembly and said pulley means for moving said scribing stylus in a first direction, a first sleeve having a first end secured to one side of said frame assembly, a sleeve retainer having an aperture for slidable engagement with the second end of said sleeve, said retainer being adapted to restrict movement of said sleeve in the direction of the sleeve longitudinal axis, a second sleeve fixedly secured to the second side of said frame assembly opposite said first side, a second sleeve retainer having an aperture for slidable engagement with said second sleeve, said second sleeve and sleeve retainer members being adapted to aid said first sleeve and sleeve retainer members in restricting the motion of said first and second sleeves in the direction along the longitudinal axis of said first sleeve, a third sleeve retainer having an aperture for receiving said first sleeve member, said third sleeve retainer being fixedly secured to said first sleeve member and movable therewith, a second tape connected between said pulley means and said third sleeve for moving said frame assembly in a second direction opposite said first direction, an adjusting member threadedly engaging said first sleeve retainer member having a first end abutting said third sleeve retainer member, said adjusting member being adapted to maintain said first and second flexible tapes at all times.

44. A data projector comprising a slide member having an opaque coating means, a scribing stylus positioned adjacent said slide member for etching said coating means, a first frame assembly resiliently mounted in said data projector, a second frame having said scribing stylus secured thereto, elongated hinge means connected to said first and second frames for pivotally mounting said second frame assembly to said first frame assembly, solenoid means secured to said first frame for pivoting said second frame about said hinge means for urging said scribing stylus into engagement with said slide member responsive to a scribing stylus initiating signal.

45. A data projector comprising a slide member having an opaque coating means, a scribing stylus positioned adjacent said slide member for etching said coating means, a first frame assembly resiliently mounted in said data projector, a second frame having said scribing stylus resiliently secured thereto, elongated hinge means connected to said first and second frames for pivotally mounting said second frame assembly to said first frame assembly, solenoid means secured to said first frame for pivoting said second frame about said hinge means for urging said scribing stylus into engagement with said slide member responsive to a scribing stylus initiating signal.

46. A data projector comprising a slide member having an opaque coating means, a scribing stylus positioned adjacent said slide member for etching said coating means, a first frame assembly resiliently mounted in said data projector, a second frame having said scribing stylus resiliently secured thereto, elongated hinge means connected to said first and second frames for pivotally mounting said second frame assembly to said first frame assembly, solenoid means secured to said first frame for pivoting said second frame about said hinge means for urging said scribing stylus into engagement with said slide member responsive to a scribing stylus initiating signal, second bias means having a first end secured to said first frame, the free end of said second bias means being positioned to abut the upper edge of said second frame for urging said stylus away from said slide member, in the absence of said scribing initiating signal.

47. A data projector comprising a slide member having an opaque coating means, a scribing stylus positioned adjacent said slide member for etching said coating means, a first frame assembly resiliently mounted in said data projector, a second frame having said scribing stylus resiliently secured thereto, elongated hinge means connected to said first and second frames for pivotally mounting said second frame assembly to said first frame assembly, solenoid means secured to said first frame for pivoting said second frame about said hinge means for urging said scribing stylus into engagement with said slide member responsive to a scribing stylus initiating signal, said solenoid means including an armature, a rotatable shaft positioned by said first frame and operatively connected to said armature at the bottom edge of said first frame assembly, a lever arm having a first end secured to said rotatable shaft, the opposite end of said lever arm abutting said second frame assembly, said lever being adapted to pivot about said rotatable shaft for moving said second frame assembly towards said slide member responsive to energization of said solenoid means.

48. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servomotor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal.

49. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servomotor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means.

50. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servomotor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal.

51. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servomotor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means.

52. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal.

53. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal, demodulating means connected to said wide band A.C. amplifier for demodulating said modulated difference signal.

54. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal, demodulating means connected to said wide band A.C. amplifier for demodulating said modulated difference signal, said oscillator means being connected to said demodulating means for demodulating said difference signal at the frequency rate of said oscillator means.

55. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal, demodulating means connected to said wide band A.C. amplifier for demodulating said modulated difference signal, said oscillator means being connected to said demodulating means for demodulating said difference signal at the frequency rate of said oscillator means, D.C. power amplifier means for providing the final amplification to said difference signal.

56. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifyng means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal, demodulating means connected to said wide band A.C. amplifier for demodulating said modulated difference signal, said oscillator means being connected to said demodulating means for demodulating said difference signal at the frequency rate of said oscillator means, D.C. power amplifier means for providing the final amplification to said difference signal, the gain of said D.C. power amplifier being substantially less than the gain of said A.C. amplifying means in order to provide the necessary overall gain while eliminating the drift and characteristics of D.C. amplifiers.

57. A servomechanism system for providing mechanical energy responsive to an electric signal, said servomechanism system including comparison means having first and second input terminals receiving an input signal and feedback signal respectively, the output of said comparison means generating a third signal which is the difference of said input and feedback signals, high gain amplifying means for amplifying said difference signal, servo motor means connected to said amplifying means for converting said amplified difference signal into mechanical energy capable of positioning a movable member, transducer means operatively connected to the output of said servomotor for generating a feedback signal proportional to said mechanical output energy, said feedback signal being impressed upon said comparison circuit second input terminal, said high gain amplifying means including means for modulating said difference signal, error sensing means connected between said comparison circuit output terminal and said high gain amplifying means for amplifying said difference signal to a level sufficient to be impressed upon the input terminal of said high gain amplifying means, a compensation network connected between said error sensing means and said high gain amplifying means for correcting the phase of said difference signal with respect to said feedback signal, said modulating means including oscillator means for modulating said difference signal at the frequency rate of the oscillator means, an A.C. amplifier circuit connected to said modulating means for amplifying the modulated difference signal, said A.C. amplifier being adapted to provide wide band frequency response to an input signal, demodulating means connected to said wide band A.C. amplifier for demodulating said modulated difference signal, said oscillator means being connected to said demodulating means for demodulating said difference signal at the frequency rate of said oscillator means, D.C. power amplifier means for providing the final amplification to said difference signal, the gain of said D.C. power amplifier being substantially less than the gain of said A.C. amplifying means in order to provide the necessary overall gain while eliminating the drift and characteristics of D.C. amplifiers, said compensation means comprising a resistive capacitive network.

58. A data projector system comprising a slide member having an opaque coating, a resilient stylus supporting assembly including a stylus positioned adjacent said slide member for etching said coating, first means for moving said stylus in response to a stylus positioning input signal, second means for positioning said slide member prior to said etching operation responsive to a slide positioning signal.

59. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed.

60. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed, and being further adapted to prevent the occurrence of said etching operation when said slide positioning operation is being performed.

61. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed, and being further adapted to prevent the occurrence of said etching operation when said slide positioning operation is being performed, said stylus carriage means including a transparent stylus mounting plate assembly for positioning and securing said stylus, a lens assembly, an illuminating source, said slide member being positioned to pass light rays from said illuminating source through the etched areas of said slide member, said lens system being adapted to focus the light rays passing through said slide member upon a projection screen.

62. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed, and being further adapted to prevent the occurrence of said etching operation when said slide positioning operation is being performed, said stylus carriage means including a transparent stylus mounting plate assembly for positioning and securing said stylus, a lens assembly, an illuminating source, said slide member being positioned to pass light rays from said illuminating source through the etched areas of said slide member, said lens system being adapted to focus the light rays passing through said slide member upon a projection screen, said slide positioning means including manually operable means for changing said slide position, first servo means responsive to said manually operable means for rotating said slide means.

63. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed, and being further adapted to prevent the occurrence of said etching operation when said slide positioning operation is being performed, said stylus carriage means including a transparent stylus mounting plate assembly for positioning and securing said stylus, a lens assembly, an illuminating source, said slide member being positioned to pass light rays from said illuminating source through the etched areas of said slide member, said lens system being adapted to focus the light rays passing through said slide member upon a projection screen, said slide positioning means including manually operable means for changing said slide position, first servo means responsive to said manually operable means for rotating said slide means, said first means including first servo means for moving said stylus in a first direction responsive to said stylus positioning input signal.

64. A data projector system comprising a slide member having an opaque coating, a resilient stylus supporting assembly including a stylus positioned adjacent said slide member for etching said coating, first means for moving said stylus response to a stylus positioning input signal, second means for positioning said slide member prior to said etching operation responsive to a slide positioning signal, multiplexing means for preventing the occurrence of said slide positioning operation when said etching operation is being performed, and being further adapted to prevent the occurrence of said etching operation when said slide positioning operation is being performed, said stylus carriage means including a transparent stylus mounting plate assembly for positioning and securing said stylus, a lens assembly, an illuminating source, said slide member being positioned to pass light rays from said illuminating source through the etched areas of said slide member, said lens system being adapted to focus the light rays passing through said slide member upon a projection screen, said slide positioning means including manually operable means for changing said slide position, first servo means responsive to said manually operable means for rotating said slide means, said first means including first servo means for moving said stylus in a first direction responsive to said stylus positioning input signal, second servo means for moving said stylus in a second direction perpendicular to said first direction responsive to said stylus positioning input signal.

References Cited in the file of this patent

UNITED STATES PATENTS

| | | |
|---|---|---|
| 2,498,649 | Clark | Feb. 28, 1950 |
| 2,527,835 | Miller | Oct. 31, 1950 |
| 2,557,329 | Wild | June 19, 1951 |
| 2,787,511 | Ehret | Apr. 2, 1957 |
| 2,859,659 | Fenske et al. | Nov. 11, 1958 |
| 2,916,550 | Anderson et al. | Dec. 8, 1959 |
| 2,975,235 | Leitner et al. | Mar. 14, 1961 |